(12) United States Patent
Kotz

(10) Patent No.: US 8,534,760 B2
(45) Date of Patent: Sep. 17, 2013

(54) HEADREST FOR A VEHICLE SEAT

(75) Inventor: Maximilian Kotz, Rieden (DE)

(73) Assignee: Grammer AG, Amberg (DE)

(*) Notice: Subject to any disclaimer, the term of this patent is extended or adjusted under 35 U.S.C. 154(b) by 498 days.

(21) Appl. No.: 12/614,802

(22) Filed: Nov. 9, 2009

(65) Prior Publication Data
US 2010/0127541 A1    May 27, 2010

(30) Foreign Application Priority Data

Nov. 14, 2008  (DE) .......................... 10 2008 057 468
Dec. 11, 2008  (DE) .......................... 10 2008 061 322
Aug. 26, 2009  (DE) .......................... 10 2009 038 631

(51) Int. Cl.
*A47C 7/36*   (2006.01)

(52) U.S. Cl.
USPC .......................................................... 297/391

(58) Field of Classification Search
USPC ..................................... 297/216.12, 409, 391
See application file for complete search history.

(56) References Cited

U.S. PATENT DOCUMENTS

| | | | | |
|---|---|---|---|---|
| 4,278,291 A | * | 7/1981 | Asai .............................. | 297/391 |
| 4,856,848 A | * | 8/1989 | O'Sullivan et al. ........... | 297/391 |
| 6,513,871 B2 | * | 2/2003 | Bartels ..................... | 297/216.12 |
| 6,623,073 B2 | * | 9/2003 | Schafer et al. ........... | 297/216.12 |
| 6,983,995 B1 | * | 1/2006 | Veine et al. .................... | 297/391 |
| 7,798,570 B2 | * | 9/2010 | Kwiecinski et al. ..... | 297/216.12 |
| 2005/0077762 A1 | * | 4/2005 | Kraemer et al. ......... | 297/216.12 |
| 2006/0119150 A1 | | 6/2006 | Hoffmann ................ | 297/216.12 |
| 2006/0131947 A1 | * | 6/2006 | List et al. ...................... | 297/391 |
| 2010/0026061 A1 | * | 2/2010 | McFalls et al. .......... | 297/216.12 |

FOREIGN PATENT DOCUMENTS

| | | |
|---|---|---|
| DE | 102006016270 | 10/2007 |
| DE | 102007002615 | 2/2008 |

* cited by examiner

*Primary Examiner* — Milton Nelson, Jr.
(74) *Attorney, Agent, or Firm* — Andrew Wilford

(57) ABSTRACT

A motor-vehicle headrest has a head part and a base part, the latter being surrounded by and shiftable on the head part in a predetermined direction. A pair of inner racks on the base part are directed oppositely outward toward the head part and each have an array extending in the direction of gear teeth. Similarly, a pair of outer racks on the base part are directed toward each other inward, confront the inner racks, and are formed with respective arrays extending in the direction of gear teeth. Respective gears each mesh with a respective one of the outer racks and the respective inner rack so that on movement between the inner and outer positions the gears roll between the respective racks. A play compensator between one of the racks and the respective part biases the racks and gears into tight engagement with one another.

9 Claims, 19 Drawing Sheets

HEADREST FOR A VEHICLE SEAT

FIELD OF THE INVENTION

The invention relates primarily to a vehicle-seat headrest having a base part and a headrest part movable relative to the base part between a back position and a front position by a bearing assembly comprising a first bearing element associated with the base part and a second bearing element associated with the headrest part, the first bearing element and the second bearing element forming respective bearing surfaces that are interconnected and form at least one bearing-surface pair.

BACKGROUND OF THE INVENTION

A headrest is known from DE 10 2004 059 237 [US 2006/0119150] where the head casing can be adjusted between a first and a second position relative to the support rods. Three column-like guides are anchored in the head casing and held in sliding guides that are firmly connected to the support rods.

A headrest is known from DE 10 2007 002 615 where a headrest part can be moved relative to a base part that is firmly connected to the support rods. A tubular guide is integrally molded to the headrest part can telescope in a sleeve integrally molded on the base part. The further the headrest part is offset from the base part, the smaller the effective contact surface by means of which the headrest part is supported on the base part.

A headrest is known from DE 10 2006 016 270 where the headrest part has two posts supported in guide sleeves of the base part. In this manner the headrest part can be horizontally adjusted relative to the base part. For quick forward movement of the headrest part in case of a crash, a spring is connected to a gear assembly. When the spring is released the spring travel x causes movement of the headrest part of 2x.

OBJECT OF THE INVENTION

Based on this prior art it is the object of the invention to create a headrest that is very stable in any position. Furthermore, the headrest should not make any annoying noise, and be precisely guided.

SUMMARY OF THE INVENTION

The object is primarily attained according to by a headrest having a base part and a headrest part that can be moved relative to the base part between a back position and a front position. A first bearing element is attached to the base part and is coupled with a second bearing element of the headrest part. The first bearing element and the second bearing element form bearing surfaces that directly or indirectly are coupled with each other while forming at least one bearing-surface pair. The bearing surfaces of the second bearing element are supported on the bearing surfaces of the first bearing element. The bearing surfaces of the bearing-surface pair are in contact with each other.

The term bearing element as used in the present application means bearing and guide elements. The term bearing surfaces as used in the present application means bearing and guide surfaces.

For example, the first bearing element and the second bearing element may be coupled with each other via a force-transmitter engaging into both bearing elements. The force-transmitter may be formed, for example, by one or more toothed sleeve gears. In this case, the bearing surfaces of the first bearing element and of the second bearing element mesh with the toothed sleeve gear. Together with the surface of the toothed sleeve gear, the bearing surfaces of the first bearing element and the bearing surfaces of the second bearing element form a pair of bearing surfaces that are in contact with each other.

A gear may be connected between the first bearing element and the second bearing element by means of which the first bearing element and the second bearing element operate together.

The headrest has a play compensator by means of which at least one bearing-surface pair is biased into engagement. The coupled-together surfaces of the first bearing element and of the second bearing element are biased into engagement such that forces can be transferred between the first bearing element and the second bearing element. If, for example, the bearing surfaces of the bearing-surface pair are associated with interacting positive fit means, the positive fit means are biased into positive engagement. If, for example, the bearing surfaces of the bearing-surface pair is formed by coupled-together gears, the gears are biased into engagement with each other. The first bearing element and/or the second bearing element and/or at least one force-transmitting element may be supported, for example, with movement clearance. The bearing surfaces of the bearing-surface pair are kept in contact by the play compensator such that the headrest part is precisely guided despite the movement clearance. The play compensator prevents any undesired movements of the headrest part, which would cause, for example, annoying noise.

In addition the play compensator may comprise means ensuring that the bearing surfaces of the bearing-surface pair, which engage each other in a positive fit such as via coupled-together gears, cannot move out of engagement.

The headrest part is therefore supported on the base body without play. The headrest part causes no annoying noise caused by movement clearance. More precise guiding is achieved due to the interconnection of the bearing surfaces of the bearing-surface pairs that is free of any play. Furthermore, any manufacturing tolerances of the coupled-together bearing surfaces may be compensated for by this embodiment.

According to one embodiment of the invention the play compensator comprises at least one elastic support. Due to deformation of the elastic support a return force may be applied to the elements that engage with the elastic support. The elastic support may be prestressed, for example, such that a force is continuously applied to the elements coupled-together by the elastic support. The elastic support may apply, for example, a force to the first bearing element and/or to the second bearing element and/or to the force-transmitter. For example, teeth of the headrest part may be held in engagement with teeth of a toothed gear of the force-transmitter by the elastic support. As an alternative, or in addition, teeth of the base body, for example, may be held in mesh with the teeth of the toothed gear of the force-transmitter by the elastic support. For example, the elastic support may be formed by a spring or an elastically deformable plastic.

According to a further embodiment of the invention the play compensator comprises at least one force deflector by means of which a first force having a first effective direction can be converted into a second force having a second effective direction. The force deflector makes it possible, for example, to use the return force of an elastic support to prestress multiple bearing-surface pairs while in contact with each other.

According to another embodiment the force deflector comprises at least one deflecting element biased by the elastic return force of the elastic support against a bearing surface positioned at an angle to the first effective direction. The bearing surface may be, for example, a surface of the base body, or for example, a surface of the headrest part. The deflecting element is associated with, for example, a primary bearing surface of a bearing-surface pair and biases a secondary bearing surface of the bearing-surface pair while in contact with the primary bearing surface. The primary bearing surface and the secondary bearing surface may be, for example, bearing surfaces of the first or of the second bearing element, or a bearing surface of the force-transmitter. A first deflection element and a second deflection element may be supported, for example, on the force-transmitter. The first deflection element may, for example, bias a bearing surface of the first bearing element into engagement with the force-transmitter. The second deflection element may, for example, bias a bearing surface of the second bearing element into contact with the force-transmitter.

According to a further embodiment of the invention the deflection element is formed by a ball half. The ball half has a convex surface making point contact with the bearing surface.

Regarding the characteristics of the generic part, reference is made to the explanations given as to the first-discussed aspect of the invention.

According to the second-discussed aspect of the invention the bearing assembly comprises first gear teeth associated with the first bearing element and second gear teeth associated with the second bearing element. The first gear teeth are connected with the second gear teeth. The first gear teeth and the second gear teeth may be connected with each other directly or indirectly. Pivoting of the headrest part about at least one axis may be prevented by the first gear teeth and the second gear teeth. The first gear teeth and the second gear teeth may form, for example, bearing-surface pairs whose contact surfaces in a straight line.

The coupled-together first gear teeth and the second gear teeth may form a force-transmitter of the head part.

The first gear teeth and the second gear teeth may, for example, be associated with a guide. At least one primary guide may, for example, prevent pivoting about a first axis of the headrest part. At least one secondary guide may prevent pivoting of the headrest part about a second spatial axis. In addition the guide may, for example, prevent straight-line movement in at least one direction. A precise and jam-free guiding of the headrest part is possible by the coupled-together gears.

Gears enable the transmission of large forces and guarantee precise guiding without the risk of jamming. Furthermore, gears may formed any desired transmission ratios for the gear teeth. The gear teeth may be any type of teeth, such as a gear rod, toothed rod, or the like. The coupled-together gear teeth may form a gear transmission. A step up or down may be done by the coupled-together gear teeth; in particular, the coupled-together gear teeth may at least partially produce different travels upon the movement of the headrest part between the back position and the front position. Furthermore, a supporting that is free of clearance is possible in any position of the headrest part, for example, by providing elastic supports, which stress the is coupled-together gears during engagement.

The effective length of the coupled-together gear teeth, e.g. the length over which forces from the gear teeth may be absorbed, is significant for the quality of the guide. The longer the length over which a bearing-surface pair of coupled-together gear teeth is in contact, the better the quality of the supporting and guiding, and the more effectively pivoting of the headrest part is prevented. The bearing-surface pair may, for example, use line contact.

According to a further embodiment of the invention the first bearing element and the second bearing element are coupled to each other via at least one force-transmitter. A transmission ratio can be created by the force-transmitter. As an alternative, a spacing between the first bearing element and the second bearing element may be bridged, for example, by the force-transmitter. As an alternative or in addition it is possible, for example, to provide the force-transmitter with a manual or motor drive in order to move the headrest part in this manner. The force-transmitter is in contact with the first gear teeth and the second gear teeth.

According to a further embodiment the force-transmitter may comprise at least one toothed gear. If the force-transmitter comprises at least one toothed gear, the toothed gear is in contact, for example, with the first gear teeth and with the second gear teeth. The teeth of the gear are engaged in the first gear teeth and the second gear teeth. If the force-transmitter is formed by at least one toothed gear it is possible that the first gear teeth and the second gear teeth are formed by a rack.

According to another embodiment the first gear teeth and the second gear teeth form a gear transmission. In this manner it is possible to provide a transmission ratio between movable parts of the headrest. For example, the headrest part may be supported on the base body by a gear transmission. For example, a different movement may be carried out between the headrest part and a rear cover of the headrest by the gear transmission. For example, the rear cover may move half of the travel of the headrest part on movement of the headrest part between the back position and the front position.

For example, the first bearing element comprises at least one first rack that is planar or arcuate, and the second bearing element comprises a second rack that is planar or arcuate, at least one toothed gear being provided that meshes with both the first rack and the second rack. The axial length by means of which the toothed gear engages the first rack and the second rack is substantial for the effectiveness of the guide of the headrest part. Upon the movement of the headrest part between the back position and the front position the toothed gear rolls off on both the first rack and on the second rack, the center of rotation of the toothed gear moving half of the travel relative to the headrest part. Depending on the shape and size of the toothed gear the path of travel of the headrest part may vary with the movement from the back position into the front position. Furthermore, it is possible with this embodiment to make the headrest small since the secondary bearing element moves twice the travel as the toothed gear upon the movement between the back position and the front position.

The bearing assembly may comprise, for example, at least one first guide that prevents pivoting of the headrest part about a horizontal axis extending transverse to a seat direction. The guide has, for example, first gear teeth in the form of at least one first vertical rack and second gear teeth in the form of at least a second vertical rack. The first rack and the second rack are parallel to each other. At least one toothed gear is between the first rack and the second rack, in mesh with the first rack and with the second rack. A shaft of the toothed gear may be guided, for example, in a groove of the base body. The teeth of the first rack, the second rack, and the toothed gear may be formed such that movement of the headrest part in the seat direction and against the seat direction is possible between a back position and a front position, however, pivoting about the horizontal axis mentioned above transverse to the seat direction is prevented. The gears of the first rack, the second rack, and of the toothed gear are aligned, for example, vertically.

The bearing assembly may comprise, for example, at least one second guide that prevents pivoting of the headrest part about a vertical axis. The guide has, for example, first gear teeth in the form of at least one first horizontal rack and second gear teeth in the form of at least one second horizontal rack. The first rack and the second rack are parallel to each other. For example, at least one toothed gear is between the first rack and the second rack and meshes with the first rack and with the second rack. The teeth of the first rack, the second rack, and the toothed gear may be formed such that movement of the headrest part is possible toward the seat direction and away from of the seat direction between a back position and a front position, however, pivoting about the vertical axis is prevented. The gears of the first rack, the second rack, and the toothed gear are aligned, for example, horizontally transverse to the seat direction.

According to a further embodiment the toothed gear of the force-transmitter is a cylinder. For example, the travel of the headrest part may be straight-line, if the toothed gear is cylindrical. The toothed gear and the racks may be equipped, for example, with straight teeth that extend parallel to the pivot axis of the toothed gear. The toothed gear may mesh, for example, with one or more racks, and particularly make line contact with the rack.

According to another embodiment, the toothed gear is frustoconical. The travel of the headrest part may be, for example, circular arc if the toothed gear is formed frustoconical. In this case the racks may be equipped with angled teeth that are aligned with a rotational center of the headrest part. In this embodiment the toothed gear may be equipped, for example, with straight teeth. A frustoconical set of teeth may also be engaged in a rack, and particularly form line contact with the rack.

If the headrest part is to have an arcuate travel path between the back position and the front position, a first guide comprises, for example, first gear teeth in the form of at least one first vertical rack and second gear teeth in the form of at least one second vertical rack. The first rack and the second rack are parallel to each other. For example, at least one toothed gear is between the first rack and the second rack and meshes with the first rack and with the second rack. The teeth of the first rack, the second rack, and the toothed gear are formed such that, for example, an arcuate movement of the headrest part in the seat direction and opposite the seat direction is possible between a back position and a front position. The arcuate movement has, for example, a vector in the seat direction, and a vertical vector. However, pivoting about the horizontal axis transverse to the seat direction is prevented. The gears of the first rack and of the second rack are stellate and are centered on the center point of the arcuate travel. The toothed gear is formed, for example, frustoconical, the gears of the toothed gear radiating from the center point of the arcuate travel.

For arcuate movement of the headrest part a second guide has, for example, first gear teeth in the form of at least one first rack formed convexly arcuate and extending horizontally and a second gear teeth in the form of at least one second rack formed convexly arcuate and extending horizontally. The arcuate shape of the first rack and of the second rack corresponds, for example, to the arcuate travel of the headrest part. The first rack and the second rack are parallel to each other. For example, at least one cylindrical toothed gear is between the first rack and the second rack and meshes with the first rack and with the second rack. A shaft of the toothed gear may be guided, for example, in a groove of the base body. The teeth of the first rack, the second rack, and of the toothed gear may be formed such that movement of the headrest part in the seat direction and opposite the seat direction is possible between a back position and a front position, however, pivoting about the vertical axis is prevented. The gears of the first rack, the second rack, and of the toothed gear are aligned, for example, horizontally transverse to the seat direction.

According to a further embodiment the first bearing element and the second bearing element can move relative to each other in a telescoping manner. For this purpose the first bearing element and the second bearing element are, for example, coaxial to each other in each position, and can be displaced coaxially relative to each other. Being coaxial may mean in the sense of the invention that the second bearing element can be moved relative to the first bearing element traveling parallel to a common axis. The travel may be straight or bent. Movable in a telescoping manner means in the sense of the invention that the first and the second bearing element can be displaced relative to each other between a nested position and an extended position.

According to another embodiment a housing-like cover is provided that is movable on the base part and operatively connected to the headrest part. The cover closes an area of the headrest that may be, for example, a back face relative to the travel direction. The cover may be movable into the same direction as the headrest part, or as an alternative, in a different direction. The cover may traverse the same travel during movement of the headrest part, or as an alternative, a different travel. Furthermore, the cover may have, for example, the same travel as the headrest part, or as an alternative, a different travel.

According to a further embodiment the cover is is operatively connected to an element of the force-transmitter. The element may be, for example, the pivot axis of the toothed gear that meshes with a rack of the first bearing element and with a rack of the second bearing element.

The first bearing element comprises first gear teeth, and the second bearing element comprises second gear teeth. The first gear teeth and the second gear teeth are coupled to each other. The gear teeth can be interconnected directly or indirectly. The first gear teeth and the second gear teeth embody surfaces, which form a bearing-surface pair of coupled-together gears. If, for example, a force-transmitter, particularly at least one toothed gear, is between the first gear teeth and the second gear teeth, for example, a first bearing-surface pair may be formed between the first gear teeth and the force-transmitter, and a second bearing-surface pair may be formed between the second gear teeth and the force-transmitter. The elements embodying the bearing-surface pair have surfaces being in contact with each other. According to the invention the contact surface between the surfaces of the bearing-surface pair is substantially constant in each position of the headrest part. In particular the contact surface between the surfaces of each bearing-surface pair is constant in each position of the headrest part.

This way, the headrest part has the same stability in all positions. Furthermore, no different friction forces occur in the positions of the headrest part. The displacement force necessary to move the headrest part is therefore constant.

Point contact is formed between the bearing surfaces of at least one bearing-surface pair. Point contact in the sense of the invention means that the contact surface between the elements forming the bearing-surface pair is as small as a point, for example at least one bearing surface of the bearing-surface pair may be convexly arcuate.

A low coefficient of friction is formed between the headrest part and the base part due to the point contact. The headrest part can be easily moved between the back position and the front position by the characteristics according to the invention.

BRIEF DESCRIPTION OF THE DRAWING

Further advantages of the invention are obvious from the description of the shown embodiments shown in the figures. Therein.

DETAILED DESCRIPTION

Figure 1:
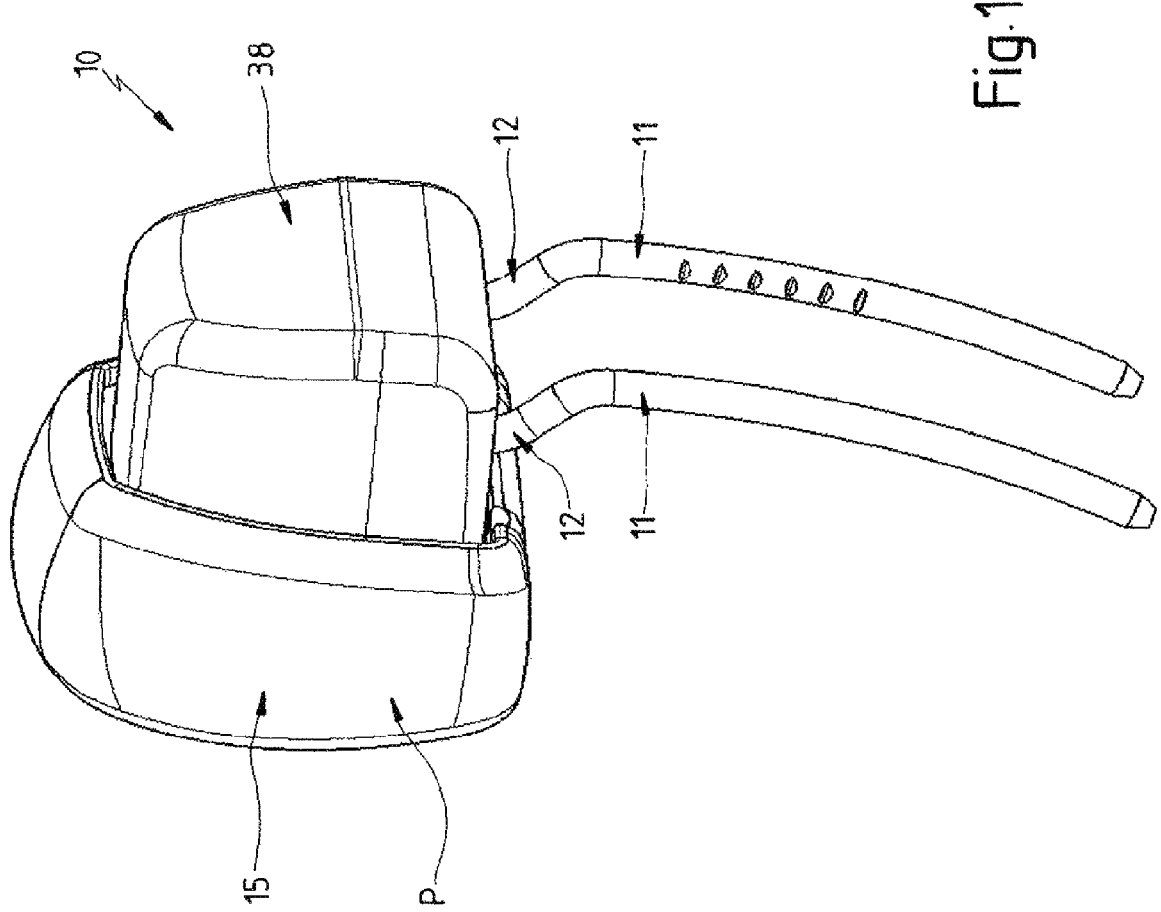
FIG. 1 is a perspective schematic rear view of the headrest according to the invention.

A headrest is shown generally at 10. The same reference numerals in different figures refer to similar parts, lower case letters being added or omitted.

The headrest 10 is anchored to the backrest of a vehicle seat (not shown) by two support rods 11. End parts 12 of the support rods 11 each fit in a respective bearing sleeve 13 of a base body 14 of the headrest 10, not shown in FIG. 1. The base body 14 is closed by a cover 38 in FIG. 1.

A bearing assembly 16 supports the headrest part 15 on the base body 14 so as to move relative to the base body 14. The headrest part 15 carries a cushion P. In the embodiment according to FIGS. 2 to 10 the headrest part 15 can be moved in a straight-line in the direction x1 and x2 between a back position shown, for example, in FIG. 4 and a front position shown in FIG. 6. In the front position the headrest part 15 is shifted relative to the back position toward the head of an unillustrated passenger in the seat.

Figure 2:
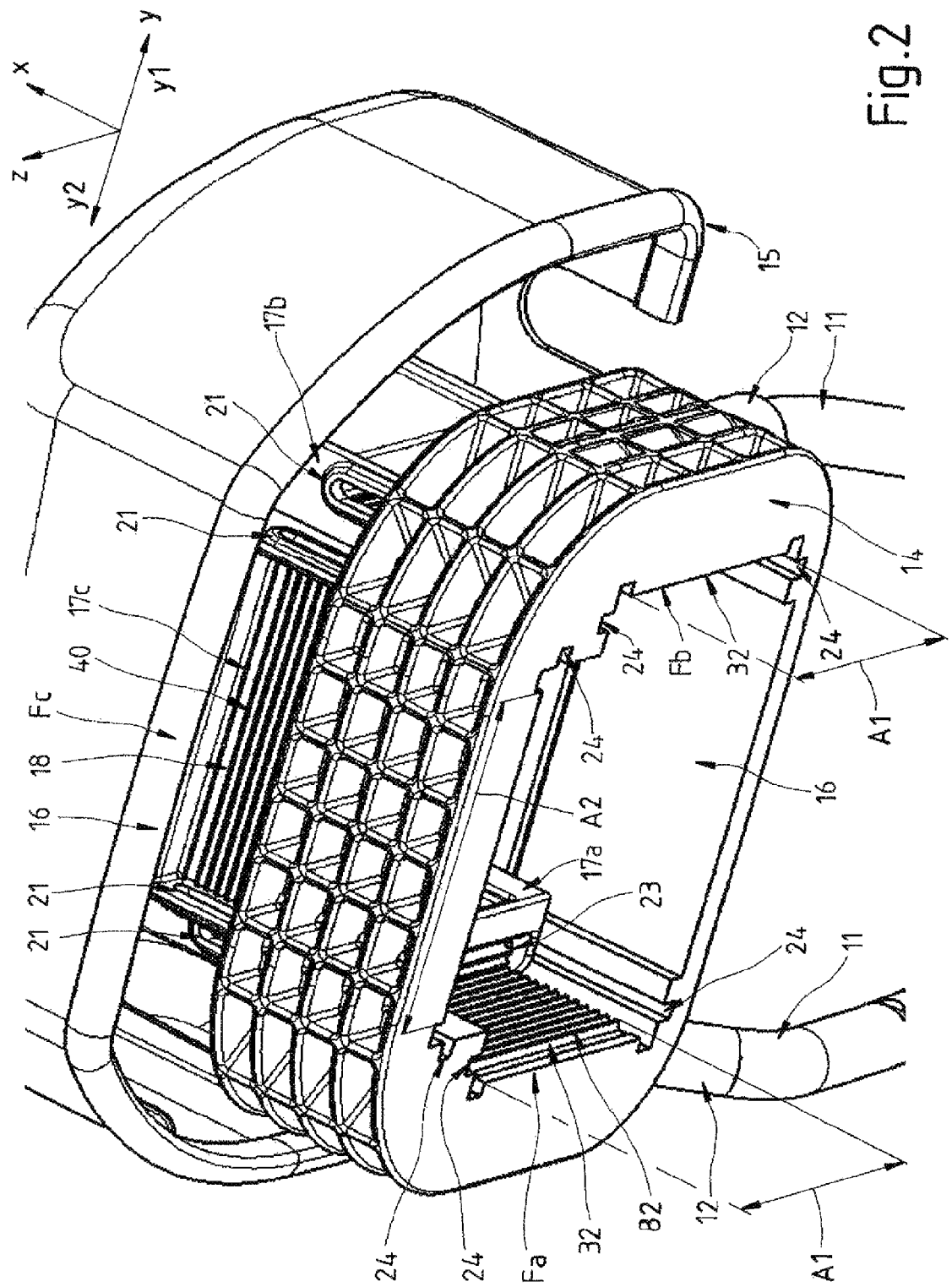
FIG. 2 is a perspective schematic rear view of the headrest without a cover.
Figure 3:
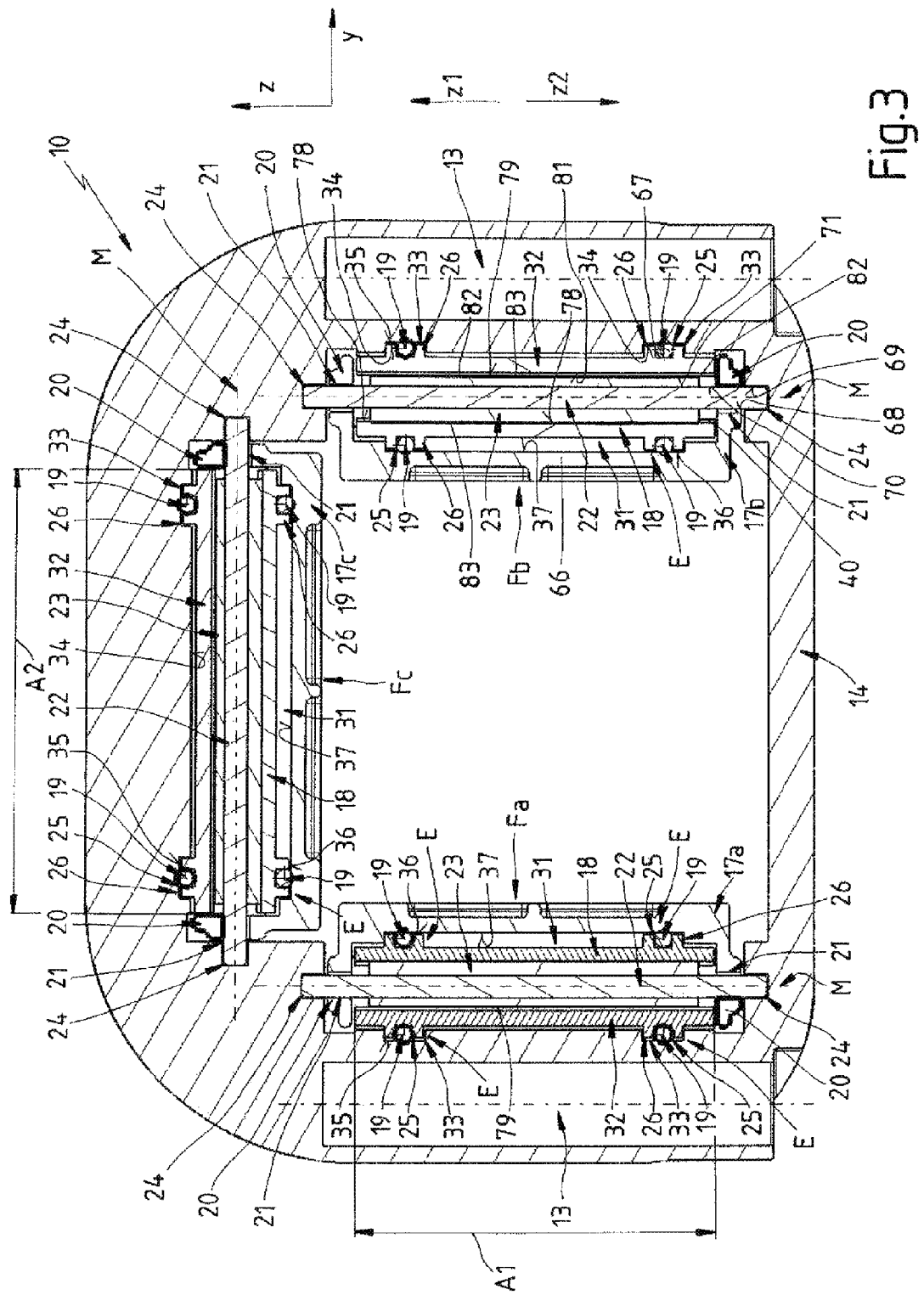
FIG. 3 is a schematic longitudinal sectional view of the headrest in a first plane, the support rods not being shown for reasons of clarity.

In FIG. 2 the headrest 10 is shown without its cover 38. The bearing assembly 16 comprises three guides Fa, Fb, and Fc. The guides Fa and Fb prevent pivoting or canting of the headrest part 15 about the y-axis and straight-line movement in directions y1 and y2 relative to the base part 14. The guide Fc prevents pivoting or canting of the headrest part 15 about the z-axis, and straight-line movement in directions z1 and z2. A respective carriage 17a, 17b, and 17c (see FIG. 3) is associated with each guide Fa, Fb, and Fc. Each of the carriages 17a, 17b, and 17c is attached to the headrest part 15 such that it can move somewhat elastically relative to the headrest part 15. The base part 14, however, is substantially rigid.

Since the construction of the three guides Fa, Fb, and Fc is substantially the same, only one guide Fa is described by way of example.

The carriage 17a comprises a plate 66 and side parts 20. The side parts 20 extend approximately at right angles to the plane of the plate 66. Two bar-shaped bearing bases 26 of a rack 18 are supported in a seat 31 of the carriage 17a. The bearing bases 26 extend parallel to the direction x1-x2. The rack 18 lies in a plane that is approximately parallel to the plane formed by the plate 66.

The rack 18 has teeth 40 on its edge turned toward a sleeve gear 23. The teeth 40 have surfaces 78.

An elastic support 19 is provided in a seat 25 of each bearing base 26 between the respective rack 18 and the carriage 17. In the embodiment according to FIGS. 2 to 10 the elastic support 19 is formed by an approximately cylindrical, rod-shaped elastic body made, for example, from plastic, rubber, or the like.

Slots 21 (see FIG. 4) formed in each of the side parts 20 of the carriage 17a are traversed by a shaft 22 having a center axis M. In this manner the carriage 17a can move relative to the shaft 22 in the direction x1-x2. The shaft 22 is supported in the base body 14 in grooves 24 that also extend parallel to the x-axis. The shaft 22 can therefore move in the direction x1-x2 relative to the base body 14. The sleeve gear 23 is rotationally fixed on the shaft 22. The sleeve gear 23 meshes with the rack 18.

A rack 32 is associated with and positioned opposite the rack 18 relative to the center axis M of the shaft 22, and has two bar-like bearing bases 26 fitted in grooves 33 of the base body 14. The rack 32 is movable parallel to the y-axis relative to the base body 14. An elastic support 19 is mounted in a seat 25 of each bearing base 26 between the respective rack 32 and the base body 14. The rack 32 also meshes with the sleeve gear 23.

Movement of the rack 18 of the guide F is possible only within the limits of the clearance between outer surface 36 of the bearing base 26 and an outer surface 79 of the sleeve gear 23. Movement of the rack 32 of the guides F is possible within the limits of the clearance between an outer surface 34 of the base body 14 and an outer surface 79 of the sleeve gear 23.

The headrest 10 has a play compensator E described below. The elastic support 19 biases the teeth 40 of the rack 18 in play-free engagement with the teeth 83 of the sleeve gear 23. The outer surface 78 of the rack 18 and the outer surface 79 of the sleeve gear 23 are kept in contact by the elastic support 19. Further-more, the elastic support 19 biases the teeth 82 of the rack 32 into play-free engagement with the teeth 83 of the sleeve gear 23. An outer surface 81 of the rack 32 and the outer surface 79 of the sleeve gear 23 are maintained in contact by the elastic support. Any gear flange clearance is therefore excluded.

The clearance between the rack 32 and the base body 13, and the clearance between the shaft 22 and the groove 24 are such that the teeth 82 of the rack 32 may not move out of engagement with the teeth 83 of the sleeve gear 23 if the outer surface 35 of the bearing base 26 abuts a groove base 67 of the groove 33, and an outer surface 71 of the shaft abuts an inner surface 68 of the groove 24. Furthermore, the clearance between the shaft 22 and the slot 21, and between the outer surface 36 of the rack 18 and an abutment surface 37 of the carriage 17a are such that the teeth 40 of the rack 18 may not move out of engagement with the teeth of the sleeve gear 23 if the outer surface 71 of the shaft 22 abuts an inner surface 69 of the groove 24, an inner surface 70 of the slot 21 abuts the outer surface 71 of the shaft 22, and the outer surface 36 abuts the contact surface 37.

In the embodiment shown in FIGS. 1 to 10 the teeth 40 of the racks 18 and 32, and of the sleeve gear 23 in the guides Fa and Fb extend parallel to the z-axis and in the guide Fc parallel to the y-axis. Each gear tooth 40 of the racks 18 and 32, and of the sleeve gear 23 of the guides Fa and Fb has an approximate length A1. Each gear of the racks 18 and 32, and of the sleeve gear 23 of the guide Fc has an approximate length A2. The racks 18 and 32 of the guides Fa and Fb are in contact with the respective sleeve gear 23 approximately over the entire length A1. The racks 18 and 32 of the guide Fc are in contact with the respective sleeve gear 23 approximately over the entire length A2. The racks 18 and 32, and of the sleeve gear 23 of the guides Fa and Fb are roughly at a right angle to the guide Fc.

White the guides Fa and Fb prevent rotation of the headrest part 15 about the y-axis, rotation about the z-axis is prevented by the guide Fc. The headrest part 15 is therefore solidly supported in any position.

The contact between the outer surface 71 of the shaft 22 and the outer surface of the groove 24 is the same in any position of the headrest part 15. Furthermore, the contact between the rack 18 and the sleeve gear 23, and between the rack 32 and the sleeve gear 23 is the same in any position of the headrest part 15 in all the guides Fa, Fb, and Fc.

Figure 4:
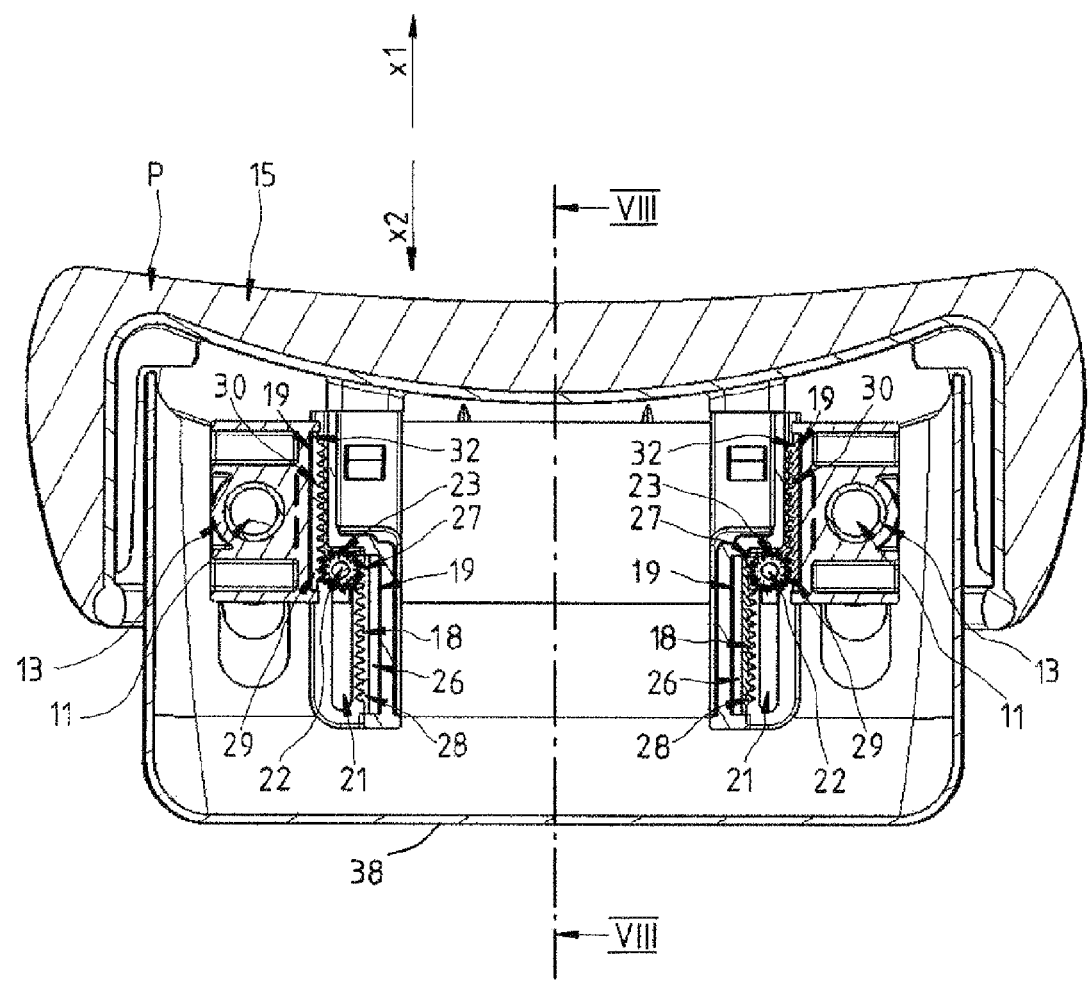
FIG. 4 is a schematic cross-sectional view of the headrest, the headrest part being in the back position.
Figure 8:
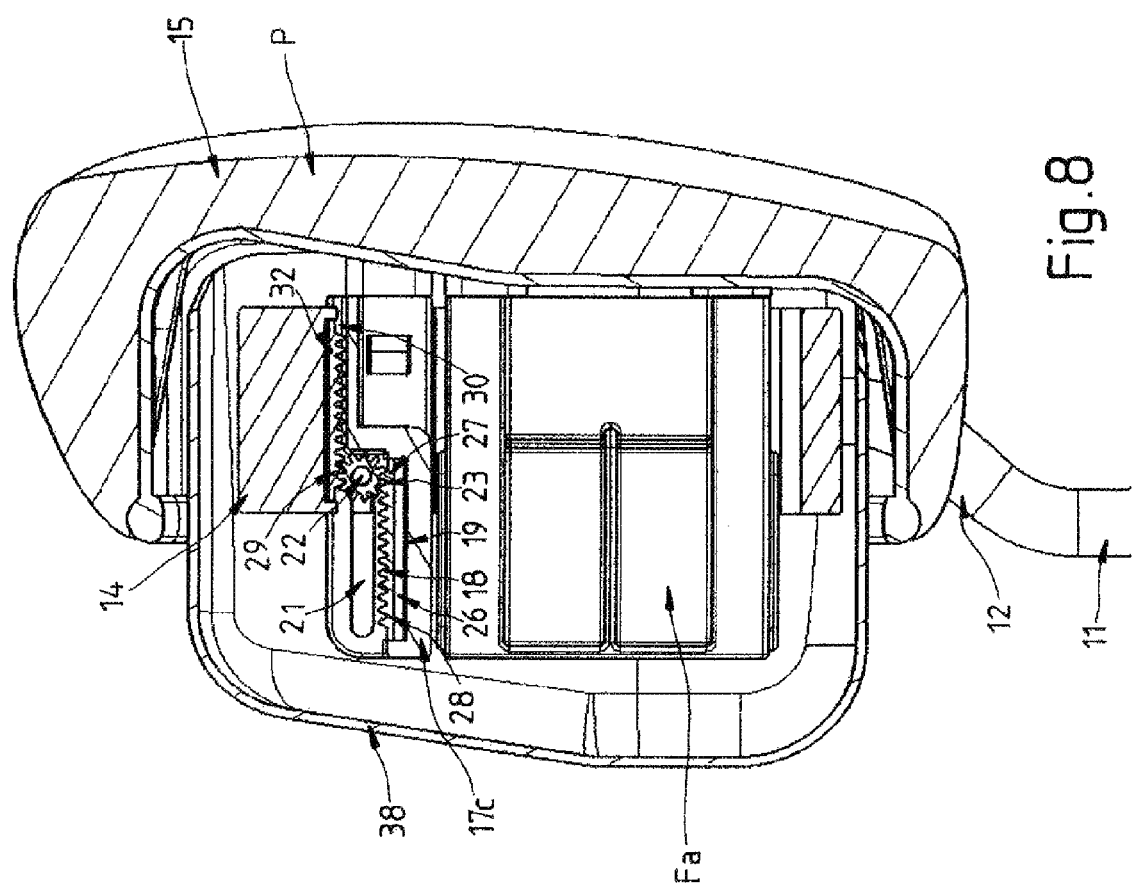
FIG. 8 is a schematic longitudinal sectional view of the headrest in a second section plane, the headrest being in the back position.

If the headrest part 15 is in the back position according to FIGS. 4 and 8, the sleeve gear 23 is in contact with a front end 27 of the rack 18 and with a rear end 29 of the rack 32.

Figure 5:
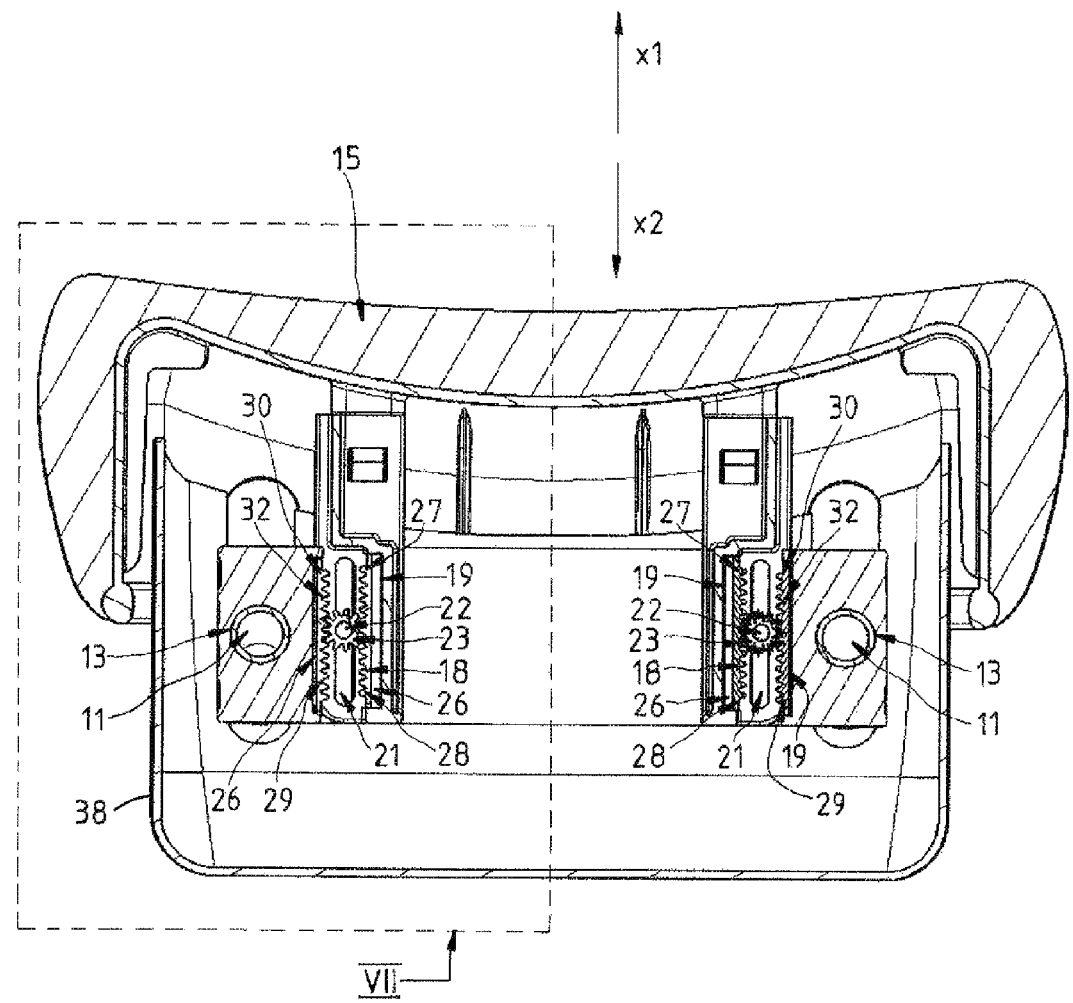
FIG. 5 shows the headrest according to FIG. 4, the headrest part being in an intermediate position.
Figure 9:
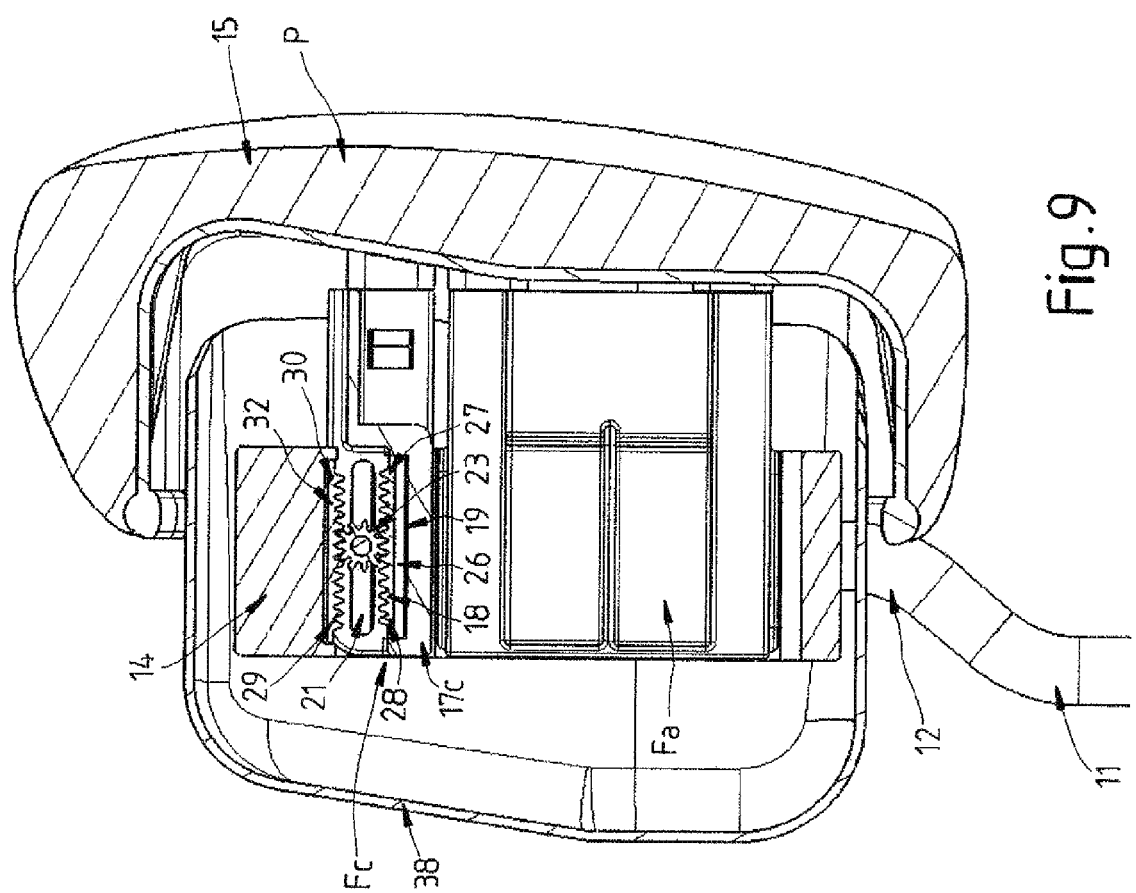
FIG. 9 is a view like FIG. 8, the headrest part being in the intermediate position.

In FIGS. 5 and 9 the headrest part 15 is shown in an intermediate position between the back position and the front position. The sleeve gear 23 is in contact with the center of the rack 18 and of the rack 32 in the intermediate position.

Figure 6:
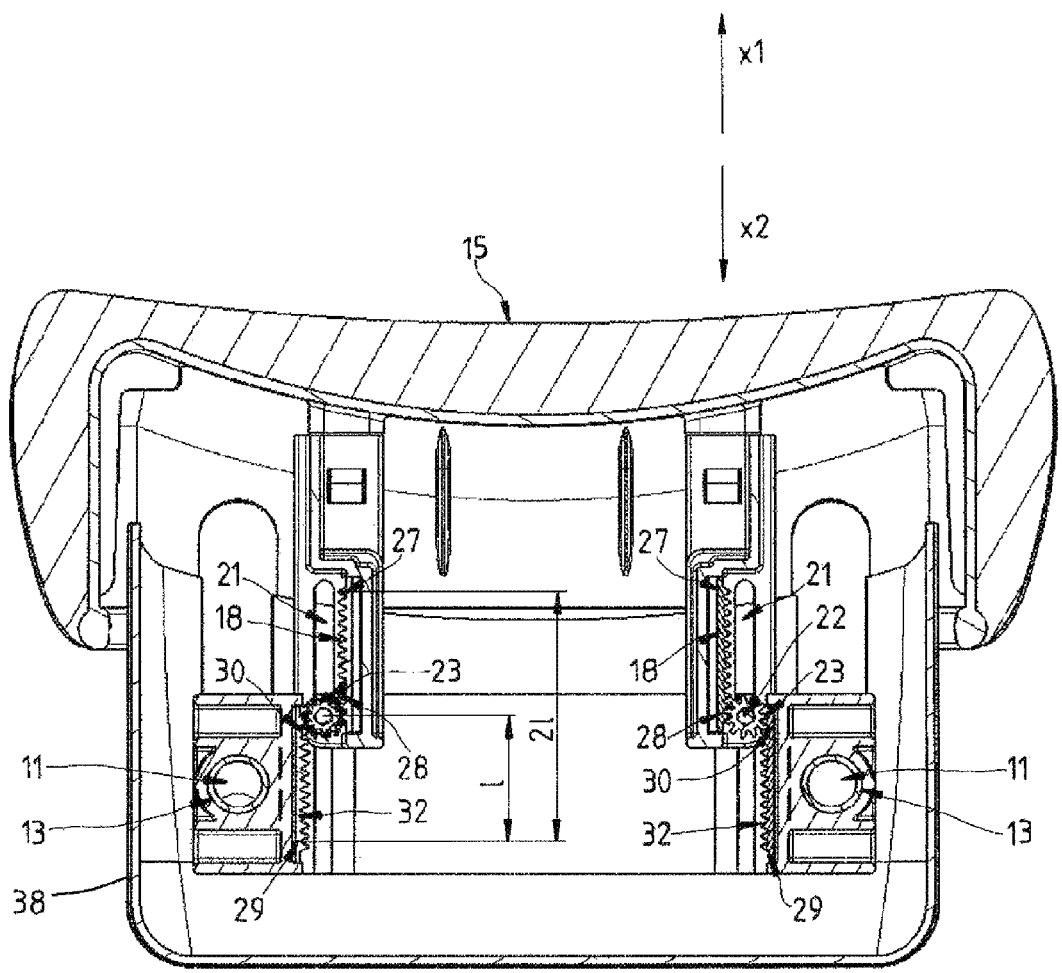
FIG. 6 shows the headrest according to FIG. 4, the headrest part being in a front position.
Figure 7:
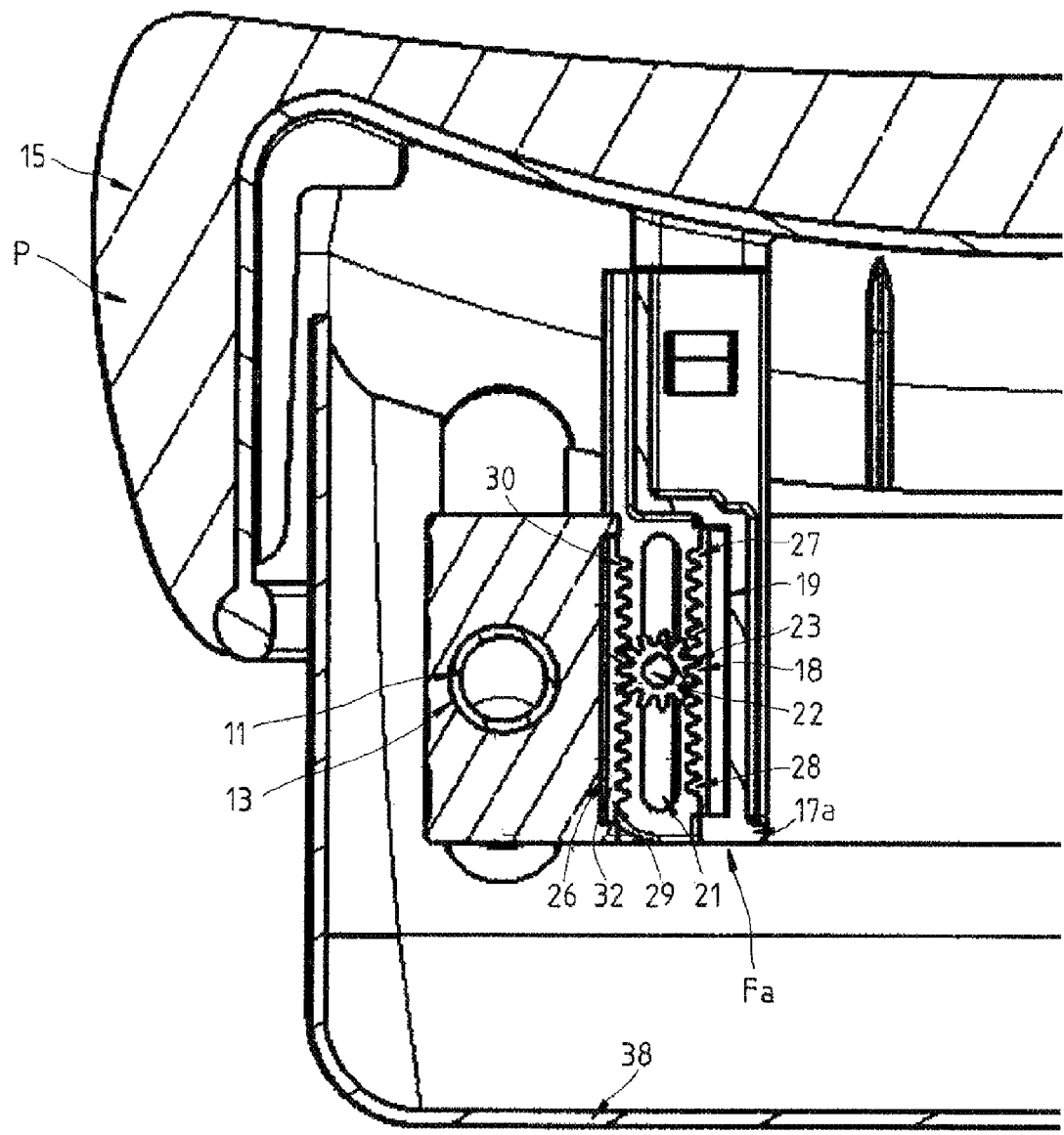
FIG. 7 is an enlarged cutout view of the detail indicated at VII in FIG. 5.
Figure 10:
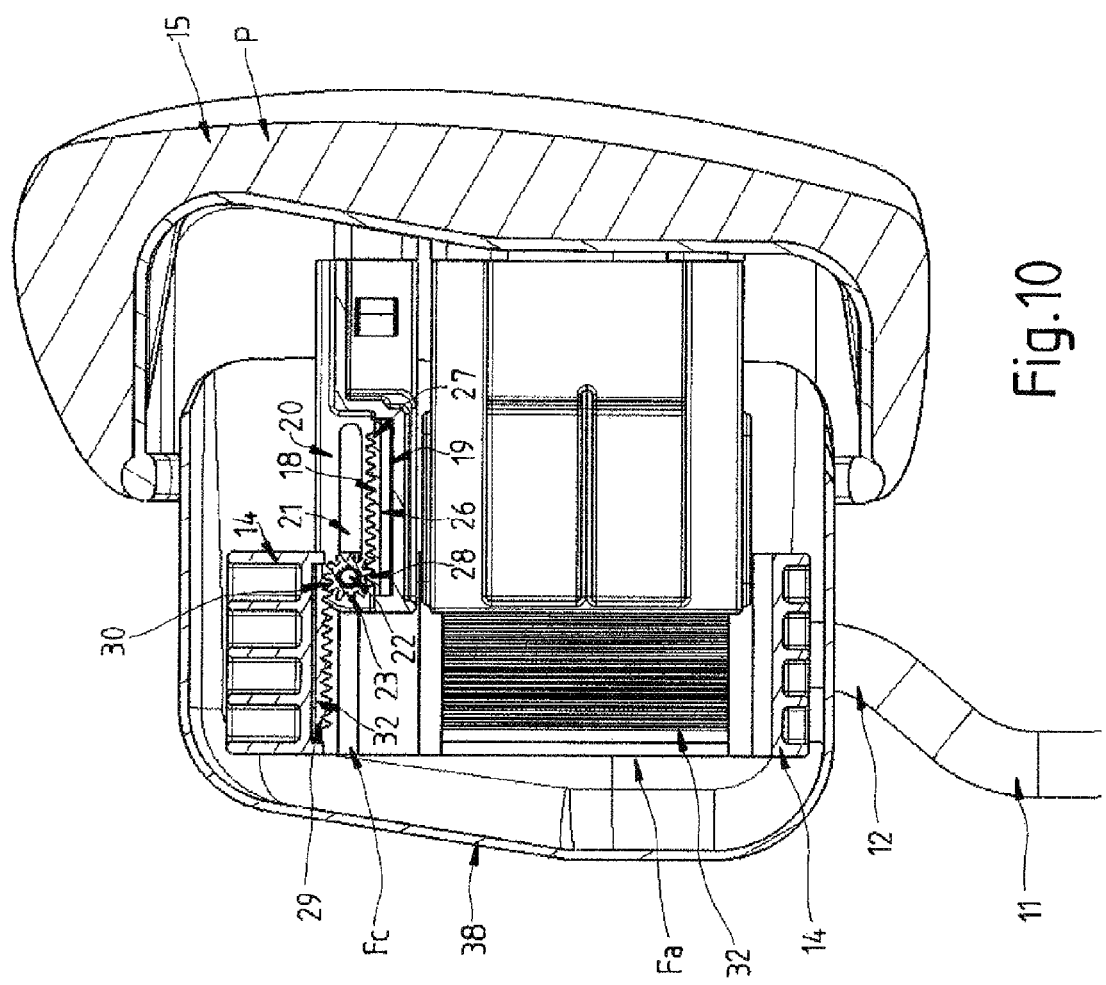
FIG. 10 is a view like FIG. 8, the headrest part being in the front position.

In FIGS. 6 and 10 the headrest part 15 is shown in the front position, in which it is located at the furthest spacing from the base body 14. In the front position the sleeve gear 23 is in contact with a rear end 28 of the rack 18 and a front end 30 of the rack 32.

If the sleeve gear 23 has traversed a length l from the rear end 29 to the front end 30 of the rack 25 (between the back position and the front position) in the direction x1, the headrest part 15 has moved by a travel equal to 2l in the direction x1 (see FIG. 6).

In the embodiment shown in FIGS. 1 to 10 the cover 38 is firmly connected to the shafts 22. Hence, if the headrest part 15 moves forward by a travel 2l in the direction x1, the cover 38 moves by a travel l in the direction x1. On rearward movement of the headrest part 15 in the direction x2 from the front position into the back position the cover 38 also covers half of the travel of the headrest part 15 due to the connection.

It is obvious from the figures as described above that the racks 18 of the guides Fa, Fb, and Fc are parallel to the respective racks 32 and can move parallel to each other. Thus the racks 18 can be displaced parallel to the racks 32. In the back position according to FIG. 4 the racks 18 are next to the racks 32, while the racks 18 and 32 are offset relative to each other in the front position according to FIG. 6. The headrest 10 therefore requires only a small installation space.

Figure 11:
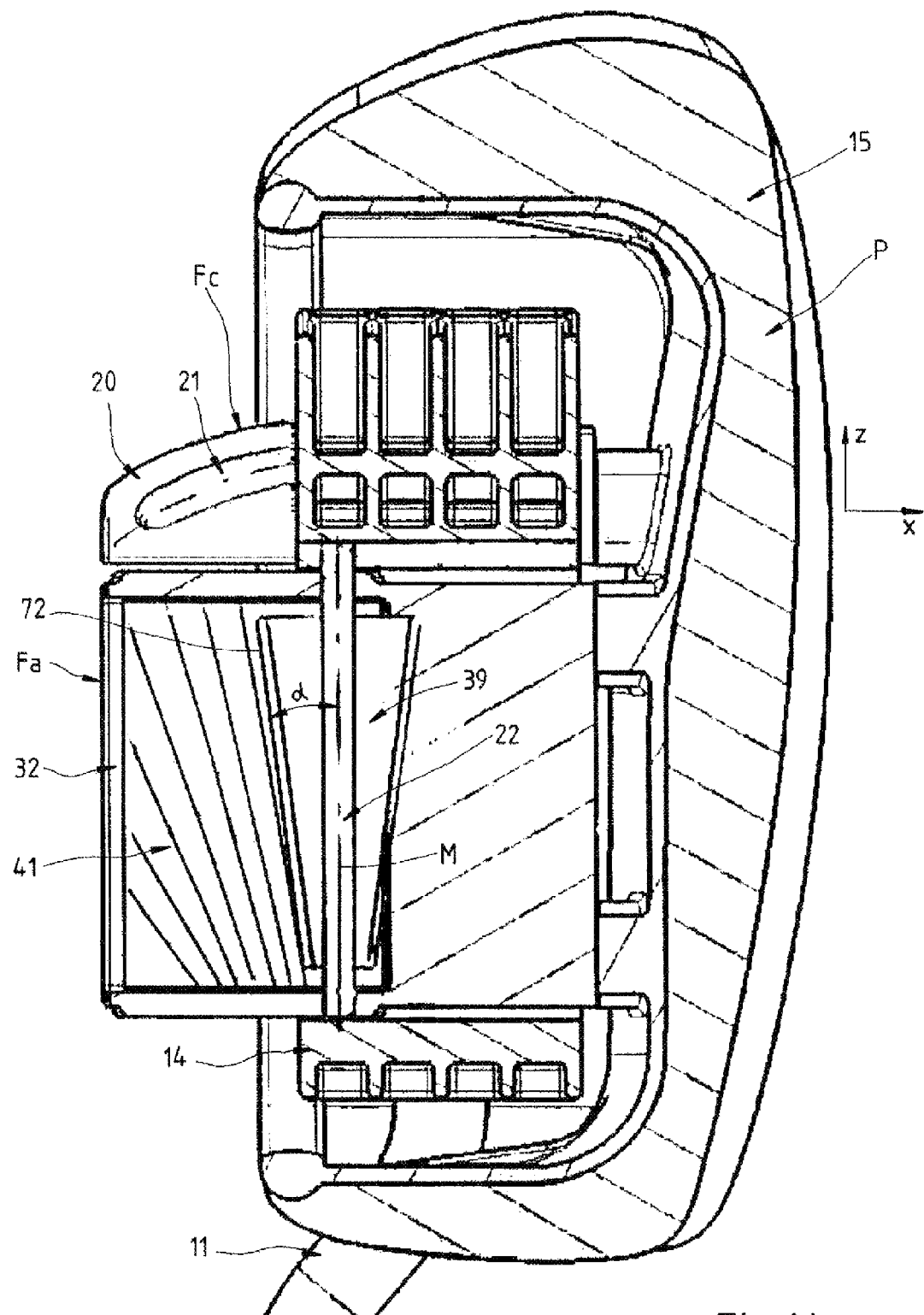
FIG. 11 is a view of a second embodiment of the headrest according of the invention according to FIG. 8, the gears of the guides Fa and Fb being frustoconical, and the racks of the guides Fa and Fb being equipped with teeth oriented in a star shape.
Figure 12:
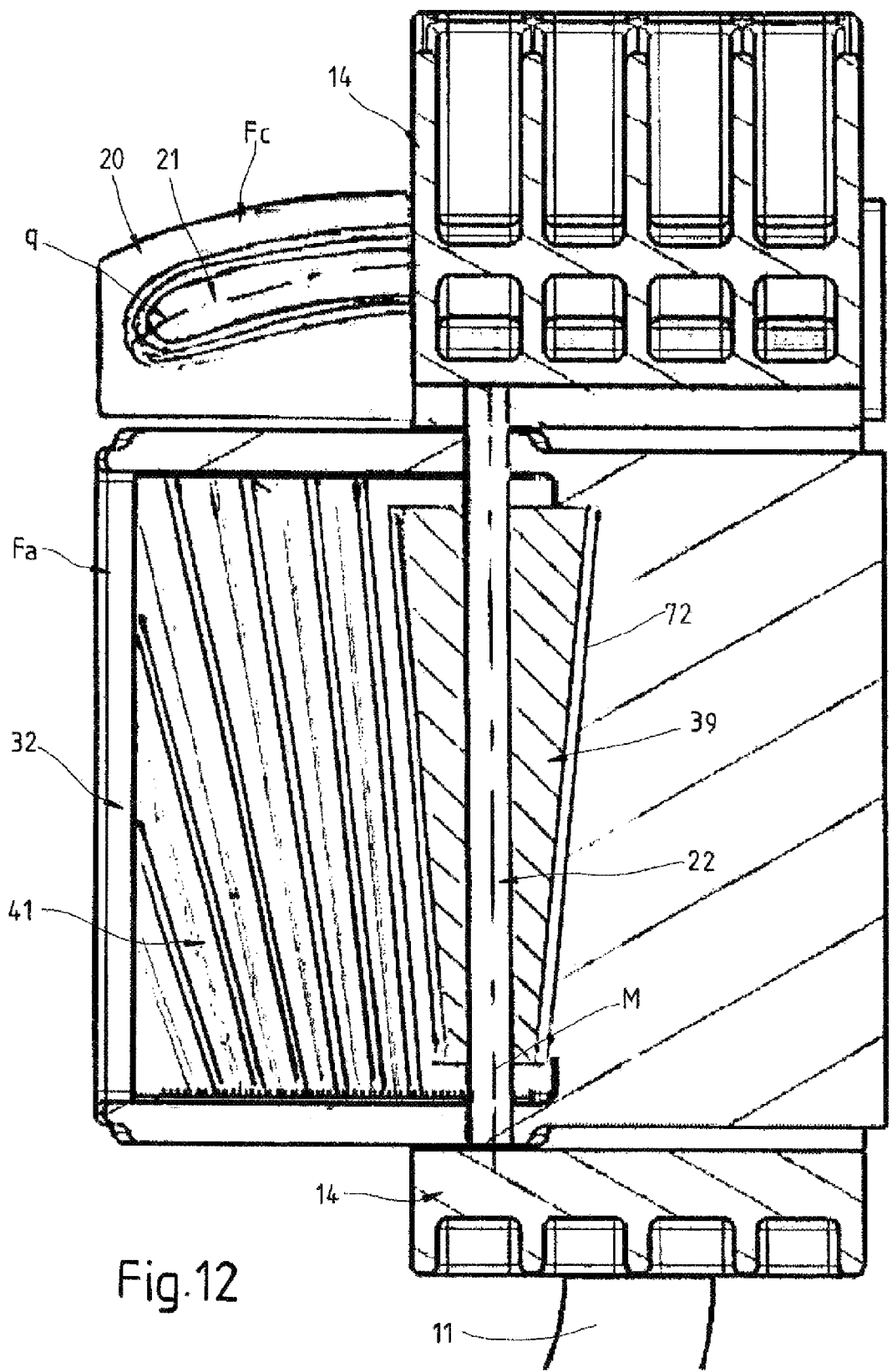
FIG. 12 is an enlarged view of the guide Fa according to FIG. 11, the headrest part not being shown, and FIG. 13 a longitudinal section like FIG. 3 of the headrest according to FIGS. 11 and 12.
Figure 13:
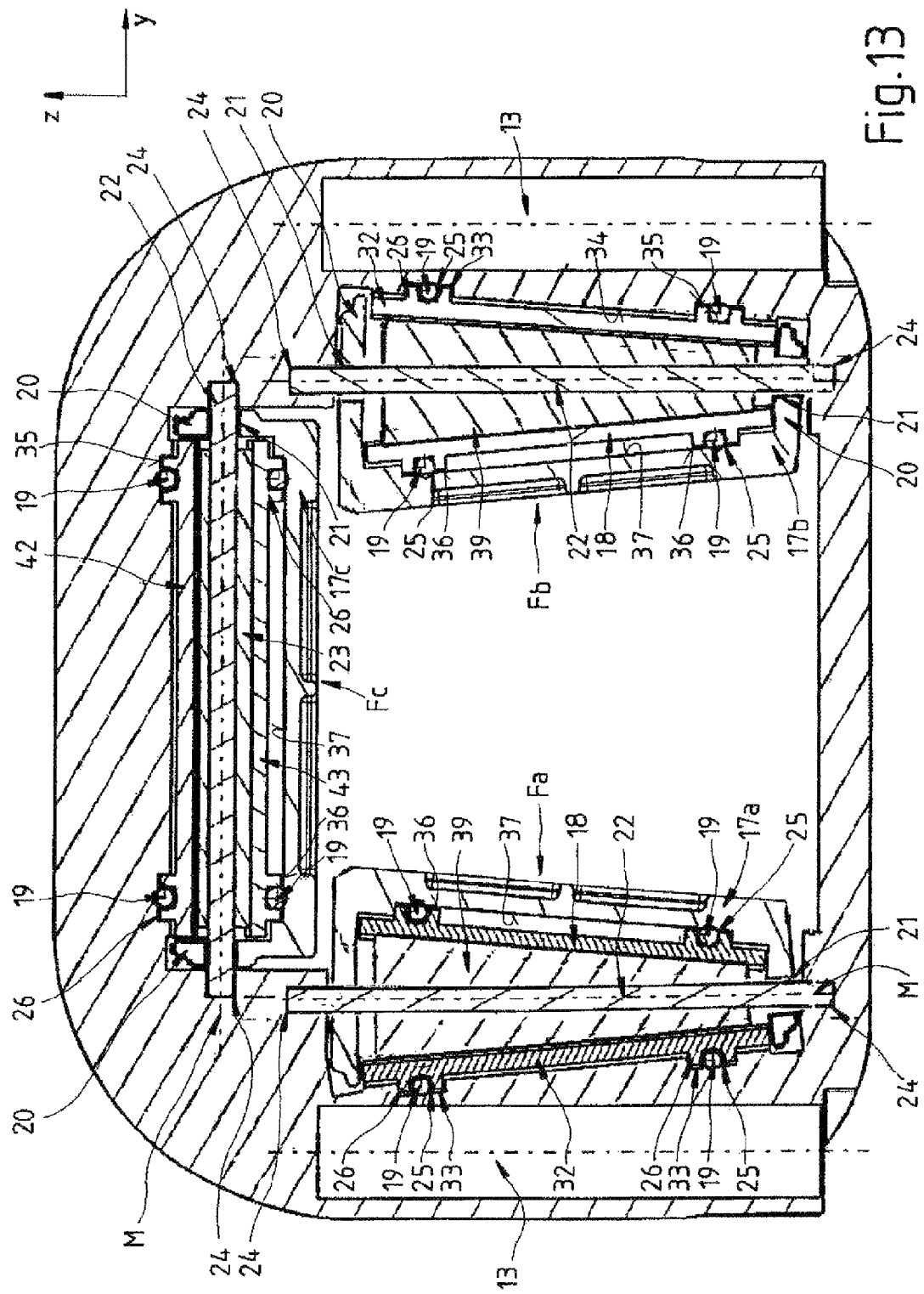

According to FIGS. 11 to 13 a second shown embodiment is show that differs from the first embodiment of FIGS. 1 to 10 in that a gear 39 of the guides Fa and Fb is frustoconical. Teeth 41 of the rack 18 meshing with the gear 39 are arrayed like a star in the guide Fa. Teeth of the rack 32 meshing with the gear 39 are also arrayed like a star (not shown). The star-shaped gears taper toward the center point of an arcuate path. The guide Fb corresponds to the illustrated guide Fa.

The sleeve gear 23 (not shown) of the guide Fc is cylindrical. The racks (also not shown) of the guide Fc are provided with straight teeth that extend parallel to the y-axis. The racks 18 and 32 of the guide Fc are arcuate corresponding to a longitudinal axis 1 of the slots 21.

In the headrest 10 according to this second embodiment the headrest part 15 moves through an arcuate path about a pivot center point (not shown) defined by a cone angle α between the longitudinal axis M of the shaft 22 and a longitudinal axis 72 of the teeth of the gear 39. It is clear that according to the invention headrests can be made that have different movement characteristics of the headrest part 15.

It should be noted that the headrest part 15 can be locked in different positions, or as an alternative in any desired position between the back position and the front position, and in the back position and the front position.

Figure 14:
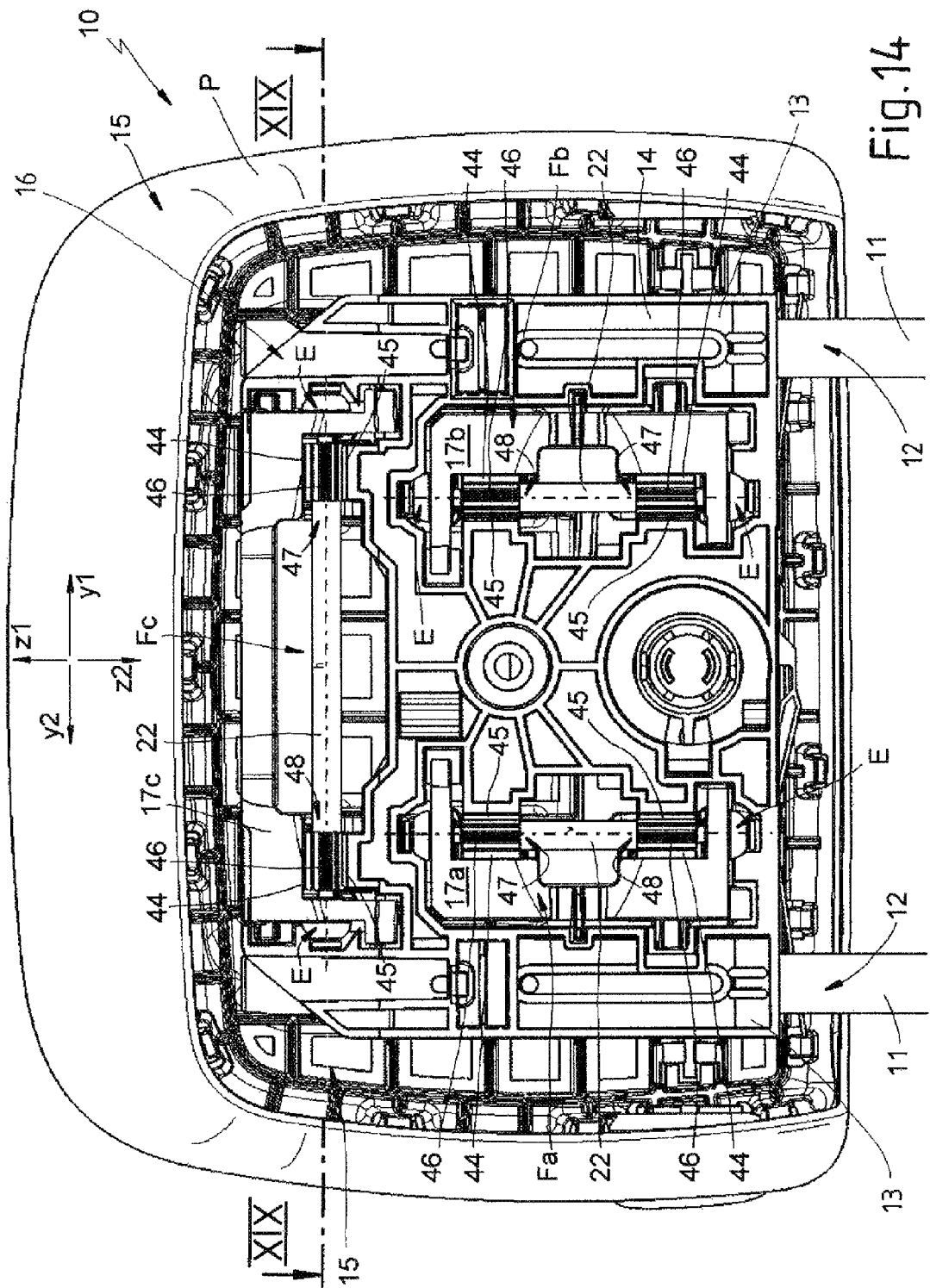
FIG. 14 is a schematic rear view of a third embodiment of the headrest, a rear cover not being shown.

A third embodiment is shown in FIGS. 14 to 19. FIG. 14 is a rear view of the headrest 10 where a rear cover is not shown. Like the first shown embodiment, the headrest part 15 can move relative to the base body 14 from a back position (see for example FIG. 19) in the direction x1 into a front position (not shown), and from the front position in the direction x2 into the back position. The base body 14 is supported on a backrest (not shown) of a vehicle seat together with support rods 11. End parts 12 of the support rods 11 fit in bearing sleeves 13 of the base body 14.

Figure 17:
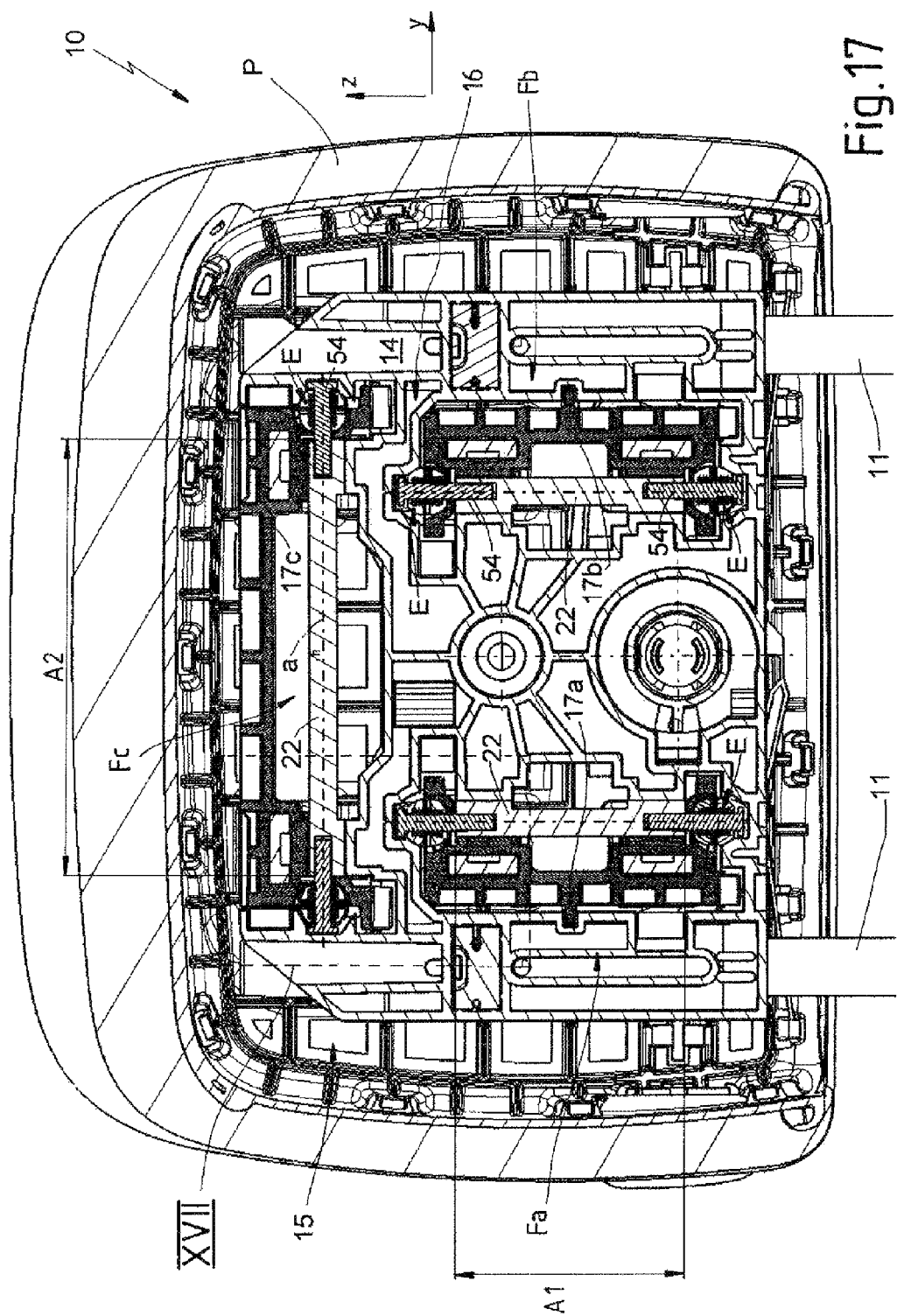
FIG. 17 is a schematic longitudinal sectional view of the headrest.

The bearing assembly 16 for supporting the headrest part 15 on the base body 14 comprises guides Fa, Fb, and Fc (see for example FIGS. 14 and 17). The guides Fa and Fb prevent pivoting or canting of the headrest part 15 about the y-axis of the headrest part 15 and straight-line movement in the directions y1 and y2. The guide Fc prevents pivoting or canting of the headrest part 15 about the z-axis and straight-line movement into the directions z1 and z2.

The guides Fa, Fb, and Fc each comprise a carriage 17. The carriages 17a, 17b, and 17c are attached to the headrest part 15. Each carriage 17a, 17b, and 17c (see for example FIG. 15) has a plate 66 and side parts 20. Teeth 44 forming racks are formed on the plate 66. The teeth 44 form an outer surface 84. In this shown embodiment two gears 44 that are spaced from each other are integrally molded on each carriage 17a, 17b, and 17c. The gears 44 of the guides Fa and Fb are set at an outer spacing A1 from each other. The gears 44 of the guide Fc are set at an outer spacing A2 from each other. The greater the outer spacing A1 and A2 of the gears, the better pivoting of the headrest part 15 about the y-axis, or about the z-axis is prevented.

A pin 54 is held in a bore 53 of the shaft 22 at each end 47 and 48 of the shaft 22. The bore 53 is coaxial to the axis M of the shaft 22. The pin 54 has a head 61 set in a groove 52 of the base body 14. The diameter of the head 61 is larger than the diameter of the bore 53. The head 61 can move in the groove 52 in the directions x1 and x2. An outer surface 86 of the head 61 is positioned at a slight spacing to an outer surface 87 of the groove. The shaft 22 may therefore move within the limits of the longitudinal extension of the groove 52 relative to the base body 14 in the directions x1 and x2.

A slot 21 is formed in each side part 20 of the carriage 17a of the guide Fa, Fb, and Fc. A longitudinal axis q of the slot 21 extends parallel to the x-axis. Each slot 21 receives a respective one of the pins 54. The carriage 17a can therefore move relative to the shaft 22 in the directions x1 and x2.

Each array of teeth 44 meshes with teeth 46 (see for example FIG. 15 and FIG. 16) rotationally fixed on the shaft 22. Therefore, two sets of teeth 46 are formed on each shaft 22. The teeth 46 may, for example, be integrally molded on the shaft 22. An approximate outer spacing A1 is formed between the pinion-like gears in the guides Fa and Fb, and an approximate outer spacing A2 is formed in the guide Fc.

Each set of teeth 46 of the shaft 22 further meshes with teeth 45 forming as a rack and firmly connected to the base body 14. The teeth 45 form an outer surface 84. Each guide Fa and Fb comprises two sets of teeth 45 integrally molded on the base body 14 and set at an outer spacing A1 to each other. Each guide Fc comprises two sets of teeth 45 integrally molded on the base body 14 and set at an outer spacing A2 to each other.

As an alternative to the two gears 44, the two sets of teeth 46, and the two sets of teeth 45 of the guides Fa, Fb, and Fc, each guide Fa, Fb, and Fc may be provided with only one teeth 44, 45, or one set of teeth 46, wherein the teeth 44, 45 and the teeth 46 in the guides Fa and Fb have a length A1 and a length A2 in the guide Fc.

Figure 15:
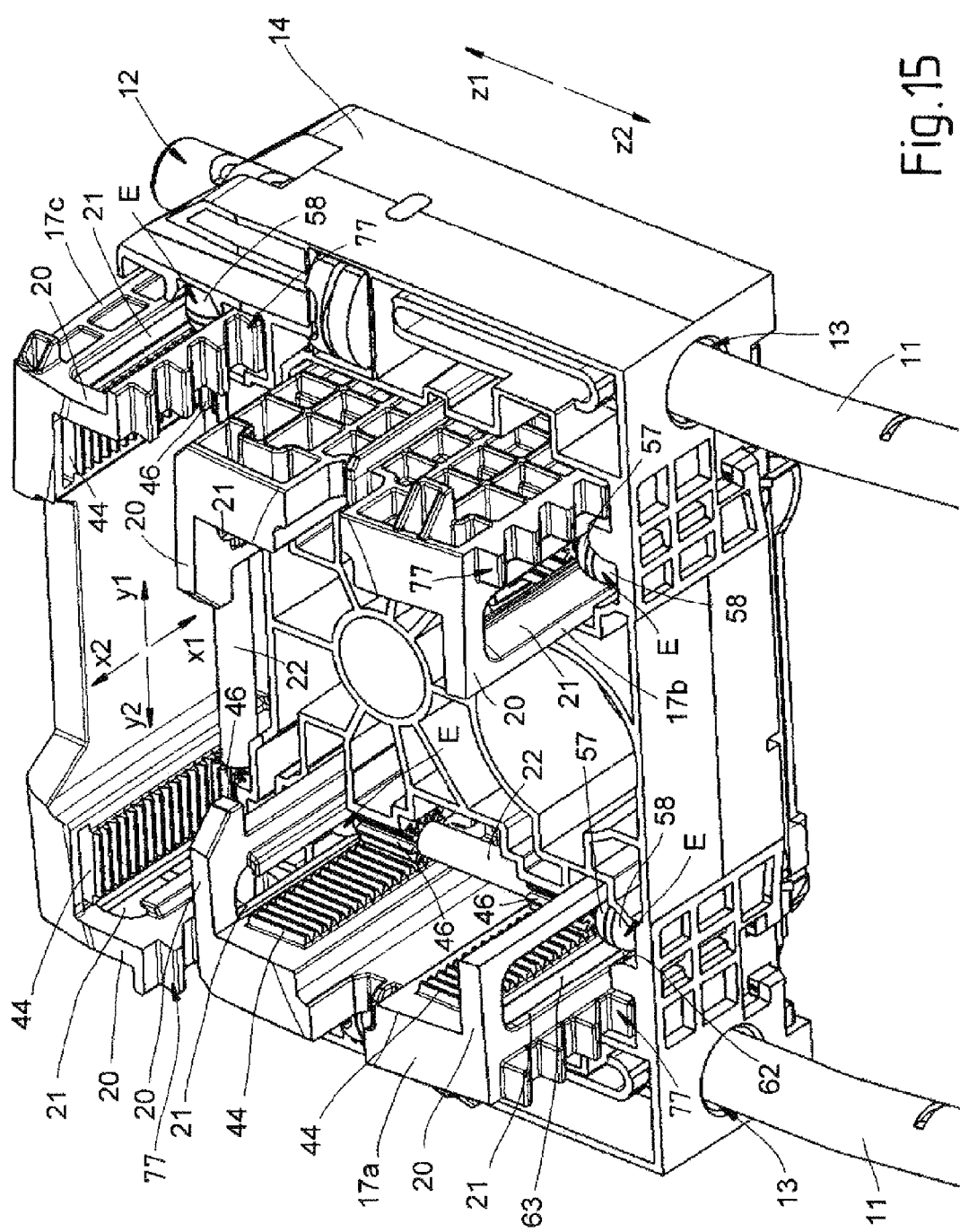
FIG. 15 is a schematic perspective rear view of the headrest, the rear cover and cushion not being shown.
Figure 16:
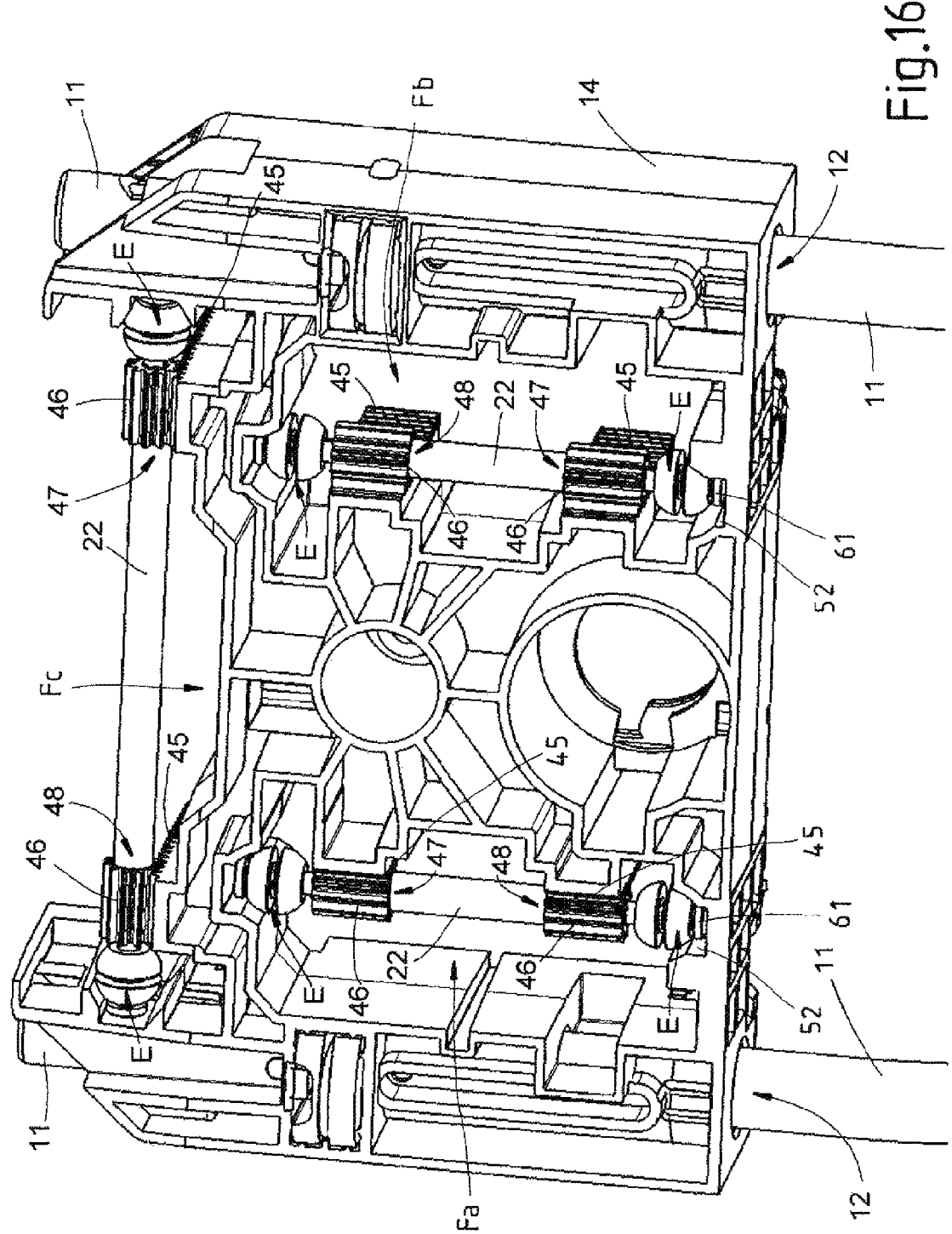
FIG. 16 is a schematic perspective rear view of the headrest, a rear cover and the headrest part not being shown.

The racks 44 of the carriages 17a, 17b, and 17c are, for example, clear in FIG. 15, the teeth 45 of the base body 14 are, for example, obvious in FIG. 16. For reasons of clarity the headrest part 15 is not shown in FIG. 15, and the headrest part 15 and the carriages 17a, 17b, and 17c are not shown in FIG. 16.

Figure 18:
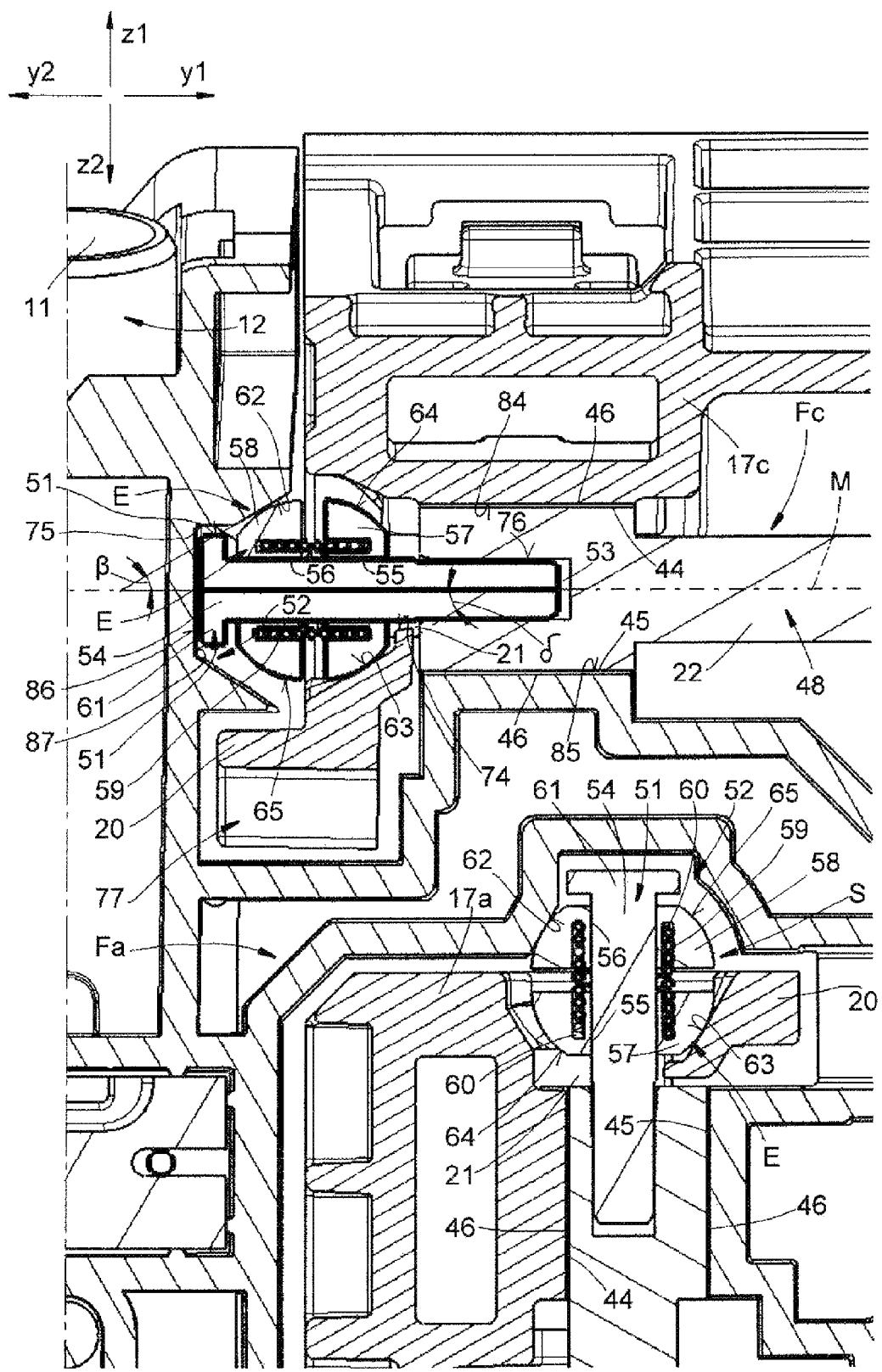
FIG. 18 is a sectional view according to section line XIX-XIX of FIG. 14.
Figure 19:
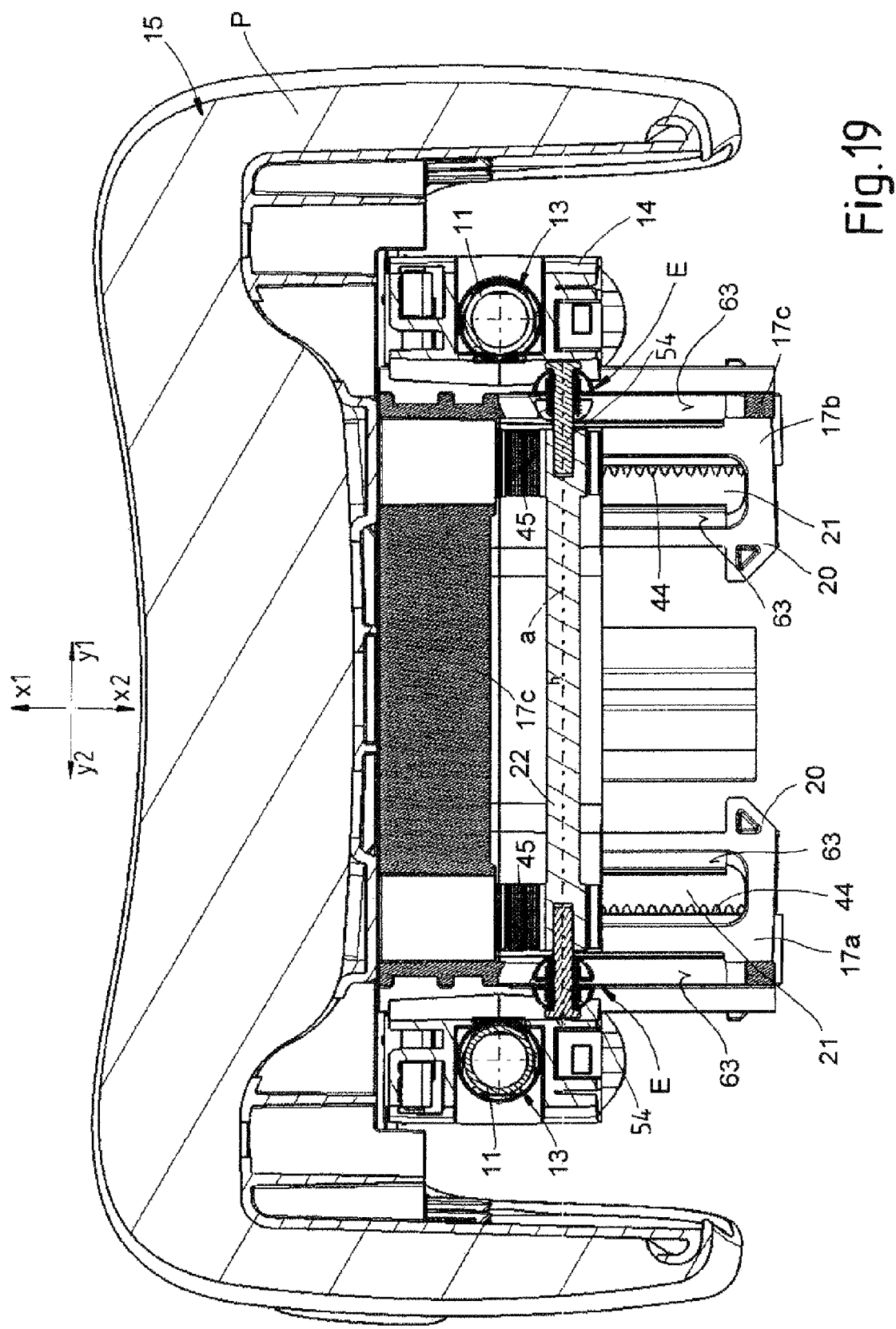
FIG. 19 is a horizontal section view through the headrest of the embodiment of FIGS. 14-18.

The carriage 17a and the shaft 22 of the guides Fa, Fb, and Fc are supported with play. A play compensator E of the headrest 10 is described below by way of example with reference to the guide Fc. The end 48 of the shaft 22 of the guide Fc is shown in FIG. 18. Movement of the shaft 22 of the guide Fc in the direction z1 relative to the base body 22 is possible until a side surface 51 of the head 61 of the pin 54 stops at an end surface 75 of the groove 52. Movement of the carriage 17a relative to the shaft 22 in the direction z1 can therefore occur only until an inner end 74 of the slot 21 stops at an outer surface 76 of the pin 54. On contact between the outer surface 51 of the head 61 and the side surface 75 of the groove 52, the teeth 46 engage into the teeth 45 of the base body 14. Furthermore, the teeth 44 of the carriage 17c and the teeth 46 of the pinion engage when the inner end 74 of the slot 21 stops the outer surface 76 of the pin 54.

Like to the guide Fc the guides Fa and Fb also have play, movement of the shaft 22 and of the carriage 17a being possible parallel to the y-axis.

The pin 54 extends through a bore 55 of a first ball half 58. A cavity for a spring 59 is adjacent the bores 55 and 56. The spring 59 is biased in the shown installation situation, and is supported on an annular shoulder 60 of the ball halves 57, 58. thus it biases the ball half 57 of the guide Fc shown, for example, in FIG. 18, in the direction y1, and the ball half 58 in the opposite direction y2.

The ball half 58 engages a bearing surface 62 of the base body 14. The bearing surface 62 is inclined toward the longitudinal axis M of the shaft 22 at an angle β. Due to the inclination of the bearing surface 62 a portion of the spring force of the spring 59 acts at a right angle to the longitudinal axis M of the shaft 22 and biases the pin 54, and thus the teeth 46 in the direction z2 into engagement with the teeth 45 of the base body 14. The force by means of which the teeth 46 are biased while being in engagement with the teeth 45 depends on the angle β and on the force of the spring 59.

The ball half 57 is supported on a bearing surface 63 of the carriage 17c. The ball half 63 (see FIG. 18, guide Fc, end part 48 of the shaft 22) is biased by the spring 59 in the direction z1. The bearing surface 63 of the carriage 17c is inclined toward the center axis a at an angle δ. A portion of the spring force of the spring 59 acts perpendicular to the center axis a of the shaft 22 and biases the carriage Fc in the direction z2 so that the rack 44 is spring-loaded into engagement with the teeth 46 of the pinion.

The ball halves 57 and 58 therefore represent deflection elements for the spring force of the spring 59 that acts parallel to the longitudinal axis a of the shaft 22.

The outer surface 64 of the ball half 57 is in point contact with the bearing surface 63. The outer surface 65 of the ball half 58 is in point contact with the bearing surface 63. In this manner sliding friction during movement of the headrest part 15 is low between the back position and the front position.

The contact between the outer surface 62 of the base body 14 and the outer surface 65 of the ball half 58, and the contact between the outer surface 63 of the carriage 17a and the outer surface 64 of the ball half 57 are constant in any position of the headrest part 15. Furthermore, the contact between the gears 44, 45, and 46 of each guide Fa, Fb, and Fc is constant in any position of the headrest part 15. The teeth 44 of each guide Fa, Fb, and Fc form a bearing-surface pair together with the teeth 46 of the shaft 22. Furthermore, the teeth 45 of each guide Fa, Fb, and Fc form a bearing-surface pair together with the teeth 46 of the shaft 22. The contact of each bearing-surface pair 44/46 and 45/46 of each guide Fa, Fb, and Fc is formed as a line contact having the long contact length of the bearing element being engaged. The headrest part 15 is therefore supported on the base body 14 with the same bearing surface in any position.

Like the first shown embodiment shown in FIGS. 1 to 10 the headrest part 15 traverses twice the travel relative the shaft 22 during movement between the back and the front position.

For the sake of completeness it should be noted that sets of teeth 77 are formed on each carriage 17a and 17b. Two sets of teeth 77 that are spaced to each other are formed on the carriage 17c. The sets of teeth 77 are part of a latch that enables movement of the headrest part 15 in the direction x1, but prevents return movement in the direction x2. Return movement of the headrest part 15 in the direction x2 is possible only if the latch is unlocked, for example by a pushbutton.

The invention claimed is:

1. A vehicle-seat headrest having
   a base part,
   a headrest part,
   a bearing assembly supporting the headrest part on the base part for movement relative to the base part between a back position and a front position, the bearing assembly comprising a first bearing element associated with the base part and a second bearing element associated with the headrest part, the first bearing element and the second bearing element being formed with respective gear teeth that are at least indirectly interconnected and that together form a bearing pair, and
   a play compensator that biases the bearing elements of the bearing pair into engagement.

2. The headrest according to claim 1, wherein the play compensator comprises at least one elastic support.

3. The headrest according to claim 1 wherein the play compensator has at least one force deflector by means of which a first force having a first effective direction can be converted into a second force having a second effective direction.

4. The headrest according to claim 3, wherein the first force is formed by a return force of the elastic support, and the force deflector has at least one deflection element biased by the first force against a respective one of the bearing elements and inclined toward the first effective direction.

5. The headrest according to claim 4, wherein the deflection element is formed by a ball half.

6. The headrest according to claim 4, wherein the play compensator biases the gear teeth of the bearing pair into operative engagement with each other.

7. The motor-vehicle headrest defined in claim 1 wherein the headrest part moves in a predetermined horizontal direction on movement between the front and back positions, the base part being fixed against movement in the direction relative to the vehicle seat, the teeth of the first bearing element being formed directly on the base part.

8. A motor-vehicle headrest comprising:
a base part;
a head part, one of the parts being surrounded by and shiftable on the other of the parts in a predetermined direction between a front position and a rear position;
a pair of inner racks on the one part directed oppositely outward toward the other of the parts and each having an array extending in the direction of gear teeth;
a pair of outer racks on the other part directed toward each other inward and confronting the inner racks and formed with respective arrays extending in the direction of gear teeth;
respective gears each meshing with a respective one of the outer racks and the respective inner rack, whereby on movement between the inner and outer positions the gears roll between the respective racks; and
a play compensator between one of the racks and the respective part biasing the racks and gears into tight engagement with one another.

9. The motor-vehicle headrest defined in claim 8, further comprising:
a cover carried on and movable with the gears.

* * * * *